United States Patent
Rodriguez

(10) Patent No.: US 9,516,311 B2
(45) Date of Patent: *Dec. 6, 2016

(54) CHROMA INFORMATION SIGNALING FOR VIDEO STREAMS

(71) Applicant: Cisco Technology, Inc., San Jose, CA (US)

(72) Inventor: Arturo A. Rodriguez, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 535 days.

This patent is subject to a terminal disclaimer.

(21) Appl. No.: 13/893,954

(22) Filed: May 14, 2013

(65) Prior Publication Data

US 2013/0251047 A1    Sep. 26, 2013

Related U.S. Application Data

(63) Continuation of application No. 11/532,415, filed on Sep. 15, 2006, now Pat. No. 8,442,124, which is a
(Continued)

(51) Int. Cl.
*H04N 7/50* (2006.01)
*H04N 19/46* (2014.01)
(Continued)

(52) U.S. Cl.
CPC .......... *H04N 19/00545* (2013.01); *H04N 5/76* (2013.01); *H04N 9/64* (2013.01);
(Continued)

(58) Field of Classification Search
CPC .. H04N 11/04; H04N 11/20; H04N 19/00545; H04N 19/16; H04N 19/1942; H04N 19/46; H04N 5/76; H04N 5/765; H04N 9/64; H04N 9/80942
(Continued)

(56) References Cited

U.S. PATENT DOCUMENTS 5,113,455 A    5/1992    Scott
5,121,205 A    6/1992    Ng et al.
(Continued)

OTHER PUBLICATIONS

Draft ISO/IEC 14496-10: 2002 (E), Video Coding, Draft ITU-T Rec. H.264 (2002 E), pp. i-ix, 1-132.
(Continued)

*Primary Examiner* — Tung Vo
(74) *Attorney, Agent, or Firm* — Merchant & Gould P.C.

(57) ABSTRACT

Embodiments of systems and methods for signaling chroma information for a picture in a compressed video stream are provided. One system embodiment, among others, comprises a memory with logic, and a processor configured with the logic to provide a compressed video stream that includes a picture having chroma samples and luma samples, and provide in the compressed video stream a flag for signaling information corresponding to the location of the chroma samples in relation to the luma samples in the picture, wherein a first defined flag value indicates default locations of the chroma samples in relation to the luma samples in the picture, wherein a second defined flag value indicates a presence in the compressed video stream of auxiliary chroma information corresponding to relative locations of the chroma samples to the luma samples in the picture, and wherein the number of chroma samples in the picture implied by the first defined flag value is equal to the number of chroma samples in the picture implied by the second defined flag value. Other embodiments for signaling chroma information for a picture in a compressed video stream are included herein.

20 Claims, 18 Drawing Sheets

Related U.S. Application Data continuation of application No. 10/266,825, filed on Oct. 8, 2002, now Pat. No. 7,136,417.

(60) Provisional application No. 60/395,969, filed on Jul. 15, 2002.

(51) Int. Cl.

| | | |
|---|---|---|
| *H04N 5/76* | (2006.01) | |
| *H04N 9/64* | (2006.01) | |
| *H04N 11/04* | (2006.01) | |
| *H04N 11/20* | (2006.01) | |
| *H04N 19/70* | (2014.01) | |
| *H04N 19/172* | (2014.01) | |
| *H04N 19/61* | (2014.01) | |
| *H04N 19/117* | (2014.01) | |
| *H04N 19/186* | (2014.01) | |
| *H04N 19/16* | (2014.01) | |
| *H04N 19/44* | (2014.01) | |
| *H04N 19/80* | (2014.01) | |
| *H04N 19/42* | (2014.01) | |
| *H04N 19/85* | (2014.01) | |
| *H04N 19/59* | (2014.01) | |
| *H04N 5/765* | (2006.01) | |
| *H04N 5/775* | (2006.01) | |
| *H04N 5/781* | (2006.01) | |
| *H04N 9/804* | (2006.01) | |

(52) U.S. Cl.
CPC ........... *H04N 11/044* (2013.01); *H04N 11/20* (2013.01); *H04N 19/117* (2014.11); *H04N 19/16* (2014.11); *H04N 19/172* (2014.11); *H04N 19/186* (2014.11); *H04N 19/42* (2014.11); *H04N 19/44* (2014.11); *H04N 19/46* (2014.11); *H04N 19/59* (2014.11); *H04N 19/61* (2014.11); *H04N 19/70* (2014.11); *H04N 19/80* (2014.11); *H04N 19/85* (2014.11); *H04N 5/765* (2013.01); *H04N 5/775* (2013.01); *H04N 5/781* (2013.01); *H04N 9/8042* (2013.01)

(58) Field of Classification Search
USPC .................................................. 375/240.26
See application file for complete search history.

(56) References Cited

U.S. PATENT DOCUMENTS

| | | | | |
|---|---|---|---|---|
| 5,278,647 | A * | 1/1994 | Hingorani | H04N 19/132 375/240.15 |
| 5,400,053 | A | 3/1995 | Johary et al. | |
| 5,561,463 | A | 10/1996 | Thomas et al. | |
| 5,561,467 | A | 10/1996 | Takeuchi et al. | |
| 5,565,996 | A * | 10/1996 | Ueda | H04N 9/8045 375/E7.252 |
| 5,650,824 | A | 7/1997 | Huang | |
| 5,684,544 | A | 11/1997 | Astle | |
| 5,835,145 | A | 11/1998 | Ouyang et al. | |
| 5,844,615 | A | 12/1998 | Nuber et al. | |
| 5,864,371 | A * | 1/1999 | Nayebi | H04N 9/72 348/692 |
| 5,973,740 | A | 10/1999 | Hrusecky | |
| 6,091,777 | A | 7/2000 | Guetz et al. | |
| 6,141,447 | A | 10/2000 | Linzer et al. | |
| 6,195,390 | B1 | 2/2001 | Hashino et al. | |
| 6,233,277 | B1 | 5/2001 | Özcelik et al. | |
| 6,249,549 | B1 | 6/2001 | Kim | |
| 6,259,741 | B1 * | 7/2001 | Chen | H04N 19/40 375/240.26 |
| 6,297,801 | B1 | 10/2001 | Jiang | |
| 6,529,244 | B1 | 3/2003 | Hrusecky | |
| 6,556,714 | B2 | 4/2003 | Kato | |
| 6,577,352 | B1 | 6/2003 | Park et al. | |
| 6,594,439 | B2 | 7/2003 | Imahashi et al. | |
| 6,608,935 | B2 * | 8/2003 | Nagumo | G06T 9/20 375/240.2 |
| 6,674,479 | B2 | 1/2004 | Cook et al. | |
| 6,707,937 | B1 | 3/2004 | Sobel et al. | |
| 6,714,594 | B2 * | 3/2004 | Dimitrova | H04N 21/235 375/240.12 |
| 6,744,816 | B1 | 6/2004 | Park et al. | |
| 6,747,661 | B1 | 6/2004 | Peterson | |
| 7,006,147 | B2 | 2/2006 | Willis | |
| 7,035,337 | B2 | 4/2006 | Sugiyama et al. | |
| 7,072,568 | B2 | 7/2006 | Sugiyama et al. | |
| 7,133,452 | B1 | 11/2006 | Rault | |
| 7,136,417 | B2 | 11/2006 | Rodriguez | |
| 7,414,632 | B1 | 8/2008 | Piazza et al. | |
| 7,933,339 | B2 | 4/2011 | Rodriguez | |
| 8,442,124 | B2 | 5/2013 | Rodriguez | |
| 2002/0080268 | A1 | 6/2002 | Willis | |
| 2003/0108099 | A1 * | 6/2003 | Nagumo | G06T 9/20 375/240 |
| 2003/0229900 | A1 | 12/2003 | Relsman | |
| 2004/0008790 | A1 | 1/2004 | Rodriguez | |
| 2007/0009048 | A1 | 1/2007 | Rodriguez | |
| 2007/0030904 | A1 | 2/2007 | Winger et al. | |
| 2007/0058718 | A1 | 3/2007 | Shen et al. | |
| 2007/0153918 | A1 | 7/2007 | Rodriguez | |
| 2014/0269919 | A1 | 9/2014 | Rodriguez | |

OTHER PUBLICATIONS

Draft ITU-T Recommendation H.263, dated May 2, 1996, entitled "Line Transmission of Non-Telephone Signals; Video Coding for Low Bitrate Communication," pp. 1-57 (61 pgs).
ITU-T Recommendation H-262 entitled "Generic Coding of Moving Pictures and Associated Audio Information: Video," (ISO/IEC 13818-2: 1995 (E)), (211 pgs).
Joint Video Team (JVT) of ISO/IEC MPEG & ITU-T VCEG, (ISO/IEC JTC1/SC29/WG11 and ITU-T SG 16 Q.6), (JVT-D071), 4th Meeting: Klagenfurt, Austria, Jul. 22-26, 2002, entitled "Transmission of Auxiliary Chroma Information for Upsampling," by Arturo A. Rodriguez, pp. 1-5.
Wedi, "New Results on Adaptive Interpolation Filter," Joint Video Team (JVT) of ISO/IEC MPEG & ITU-T VCEG (ISO/IEC JTC1/SC29/WG11 and ITU-T SG16 Q.6), 2002, pp. 1-14.
Supplemental European Search Report in PCT/US0321945 dated Apr. 26, 2011, (3 pgs).
Written Opinion in PCT/US03/21945 dated Aug. 13, 2004 (5 pgs).
Preliminary Examination Report in PCT/US03/21945 dated Mar. 17, 2006 (4 pgs).
Canadian Office Action in Application No. 2,492,018 dated Aug. 13, 2009 (2 pgs).
Canadian Office Action in Application No. 2,492,018 dated Aug. 20, 2008 (3 pgs).
Non-Final Office Action in U.S. Appl. No. 11/532,415 dated Nov. 28, 2008 (10 pgs).
Non-Final Office Action in U.S. Appl. No. 11/532,415 dated Apr. 28, 2009 (8 pgs).
Non-final Office Action in U.S. Appl. No. 11/549,166 dated Sep. 17, 2010, (12 pgs).
Copending U.S. Appl. No. 13/843,454, filed Mar. 15, 2013 by Rodriguez, entitled "Systems and Methods for Guided Conversion of Video from a First to a Second Compression Format".
"Information Technology—Generic Coding of Moving Pictures and Associated Audio Information: Video"; ITU-T Recommendation H.262 (Jul. 1995); ITU-T Standard Superseded (S), International Telecommunication Union, Geneva, Ch, No. H.262; Jul. 10, 1995; pp. 11-63, (cited in 01.08.2013 EP Communication).
EP Communication dated Jan. 8, 2013 in Appln No. 03 765 566.9, 5 pgs.
Office Action mailed May 9, 2005, in U.S. Appl. No. 10/266,825, 12 pgs.

(56) References Cited

OTHER PUBLICATIONS

Office Action mailed Sep. 27, 2005, in U.S. Appl. No. 10/266,825, 12 pgs.
Office Action mailed May 16, 2006, in U.S. Appl. No. 10/266,825, 15 pgs.
Office Action mailed Jul. 27, 2012, in U.S. Appl. No. 11/532,415, 10 pgs.
Office Action mailed Aug. 13, 2015, in U.S. Appl. No. 13/843,454, 62 pgs.
European Office Action dated Nov. 5, 2015 cited in Application No. 03 765 566.9, 6 pgs.
Thomas Wiegand, "Joint Final Committee raft (JFCD) of Joint Video Specification (ITU-T Rec H.264 | ISO/IEC 14496-10 AVC)"—JVT: "Text of Joint FCD for Joint Video Specification"; No. JVT-D157, Jul. 22-26, 2002; 207 pgs.
U.S. Final Office Action dated May 5, 2016 cited in U.S. Appl. No. 13/843,454, 32 pgs.

\* cited by examiner

Progressive Frame Picture 4:2:0

|     | 0 | 0.5 | 1 | 1.5 | 2 | 2.5 | 3 |
|-----|---|-----|---|-----|---|-----|---|
| 0   | x |     | x |     | x |     | x |
| 0.5 | o |     |   |     | o |     |   |
| 1   | x |     | x |     | x |     | x |
| 1.5 |   |     |   |     |   |     |   |
| 2   | x |     | x |     | x |     | x |
| 2.5 | o |     |   |     | o |     |   |
| 3   | x |     | x |     | x |     | x |
| 3.5 |   |     |   |     |   |     |   |
| 4   | x |     | x |     | x |     | x |
| 4.5 | o |     |   |     | o |     |   |
| 5   | x |     | x |     | x |     | x |
| 5.5 |   |     |   |     |   |     |   |

Interlaced Frame Picture 4:2:0

Top Field — 306

| | 0 | 0.5 | 1 | 1.5 | 2 | 2.5 |
|---|---|---|---|---|---|---|
| 0 | X | | X | | X | |
| 0.5 | O | | | | O | |
| 1 | | | | | | |
| 1.5 | X | | X | | X | |
| 2 | | | | | | |
| 2.5 | | | | | | |
| 3 | | | | | | |
| 3.5 | | | | | | |
| 4 | X | | X | | X | |
| 4.5 | O | | | | O | |
| 5 | | | | | | |
| 5.5 | X | | X | | X | |
| 6 | | | | | | |
| 6.5 | | | | | | |
| 7 | | | | | | |
| 7.5 | | | | | | |

Bottom Field — 307

| | 0 | 0.5 | 1 | 1.5 | 2 | 2.5 |
|---|---|---|---|---|---|---|
| 0 | | | | | | |
| 0.5 | | | | | | |
| 1 | X | | X | | X | |
| 1.5 | | | | | | |
| 2 | | | | | | |
| 2.5 | O | | | | O | |
| 3 | X | | X | | X | |
| 3.5 | | | | | | |
| 4 | | | | | | |
| 4.5 | | | | | | |
| 5 | X | | X | | X | |
| 5.5 | | | | | | |
| 6 | | | | | | |
| 6.5 | O | | | | O | |
| 7 | X | | X | | X | |
| 7.5 | | | | | | |

Two optional chroma offsets (Progressive)

|     | 0 | 0.5 | 1 | 1.5 | 2 | 2.5 |
|-----|---|-----|---|-----|---|-----|
| 0   | X |     |   |     |   |     |
| 0.5 |   | 0   |   |     |   | 0   |
| 1   | X |     | X |     | X |     |
| 1.5 |   |     |   |     |   |     |
| 2   | X |     | X |     | X |     |
| 2.5 |   | 0   |   |     |   | 0   |
| 3   | X |     | X |     | X |     |
| 3.5 |   |     |   |     |   |     | chroma_loc = a first value representative of a chroma offset for a progressive picture

— 402

|     | 0   | 0.5 | 1 | 1.5 | 2   | 2.5 |
|-----|-----|-----|---|-----|-----|-----|
| 0   | (1) | X   |   |     | (1) |     |
| 0.5 |     |     |   |     |     |     |
| 1   | X   | X   | X |     | X   |     |
| 1.5 |     |     |   |     |     |     |
| 2   | (1) | X   |   |     | (1) |     |
| 2.5 |     |     |   |     |     |     |
| 3   | X   | X   | X |     | X   |     |
| 3.5 |     |     |   |     |     |     | chroma_loc = a second value representative of a chroma offset for a progressive picture

Optional Chroma Offsets For Interlaced Frame Pictures

Top Field (406)

| | 0 | 0.5 | 1 | 1.5 | 2 | 2.5 |
|---|---|---|---|---|---|---|
| 0 | X | | X | | X | |
| 0.5 | | | | | | |
| 1 | B | | | | B | |
| 1.5 | | | | | | |
| 2 | (C) | | X | | (C) | |
| 2.5 | | | | | | |
| 3 | | | | | | |
| 3.5 | | | | | | |
| 4 | X | | X | | X | |
| 4.5 | | | | | | |
| 5 | B | | | | B | |
| 5.5 | | | | | | |
| 6 | (C) | | X | | (C) | |
| 6.5 | | | | | | |
| 7 | | | | | | |
| 7.5 | | | | | | |

Bottom Field (407)

| | 0 | 0.5 | 1 | 1.5 | 2 | 2.5 |
|---|---|---|---|---|---|---|
| 0 | | | | | | |
| 0.5 | | | | | | |
| 1 | X | | X | | X | |
| 1.5 | | | | | | |
| 2 | G | | | | G | |
| 2.5 | | | | | | |
| 3 | (L) | | X | | (L) | |
| 3.5 | | | | | | |
| 4 | | | | | | |
| 4.5 | | | | | | |
| 5 | X | | X | | X | |
| 5.5 | | | | | | |
| 6 | G | | | | G | |
| 6.5 | | | | | | |
| 7 | (L) | | X | | (L) | |
| 7.5 | | | | | | |

Optional Chroma Locations For Interlaced Frame Pictures

408

| | 0 | 0.5 | 1 | 1.5 | 2 | 2.5 |
|---|---|---|---|---|---|---|
| 0 | (Cr) | | X | | | |
| 0.5 | | | | | | |
| 1 | | | | | | |
| 1.5 | | | | | | |
| 2 | (Cb) | | X | | | |
| 2.5 | | | | | | |
| 3 | | | | | | |
| 3.5 | | | | | | |
| 4 | (Cr) | | X | | | |
| 4.5 | | | | | | |
| 5 | | | | | | |
| 5.5 | | | | | | |
| 6 | (Cb) | | X | | | |
| 6.5 | | | | | | |
| 7 | | | | | | |
| 7.5 | | | | | | |

Top Field

409

| | 0 | 0.5 | 1 | 1.5 | 2 | 2.5 |
|---|---|---|---|---|---|---|
| 0 | | | | | | |
| 0.5 | | | | | | |
| 1 | (Cb) | | X | | | |
| 1.5 | | | | | | |
| 2 | | | | | | |
| 2.5 | | | | | | |
| 3 | (Cr) | | X | | | |
| 3.5 | | | | | | |
| 4 | | | | | | |
| 4.5 | | | | | | |
| 5 | (Cb) | | X | | | |
| 5.5 | | | | | | |
| 6 | | | | | | |
| 6.5 | | | | | | |
| 7 | (Cr) | | X | | | |
| 7.5 | | | | | | |

Bottom Field

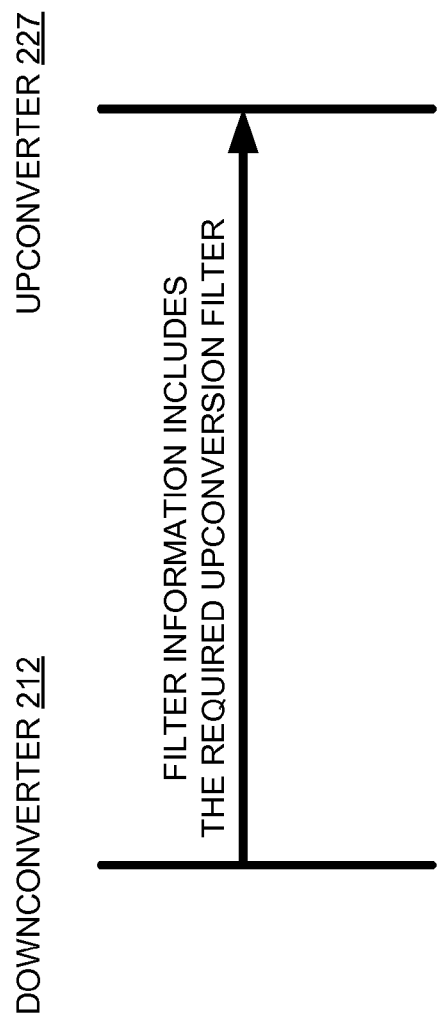
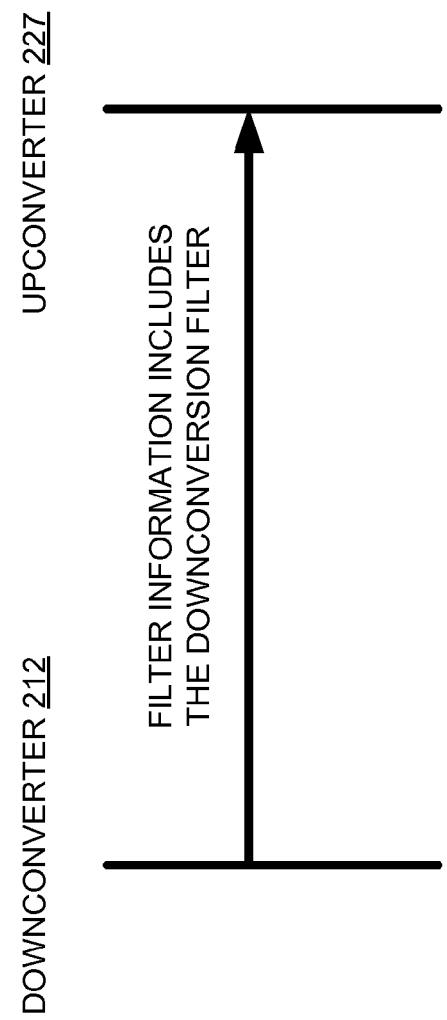

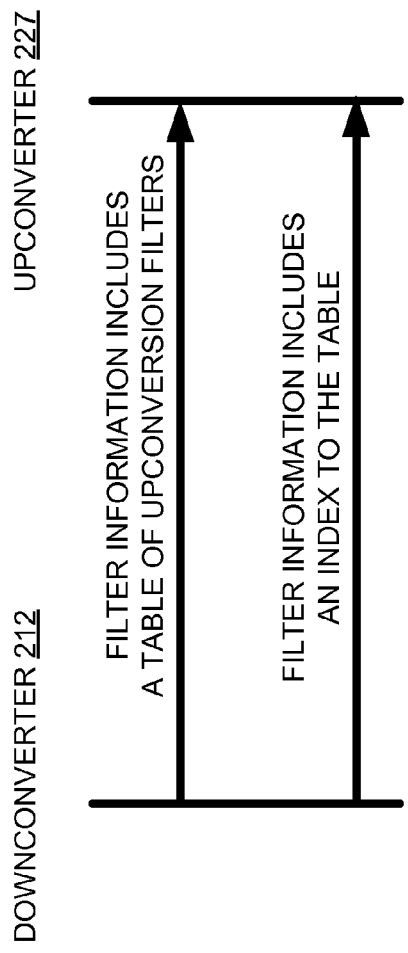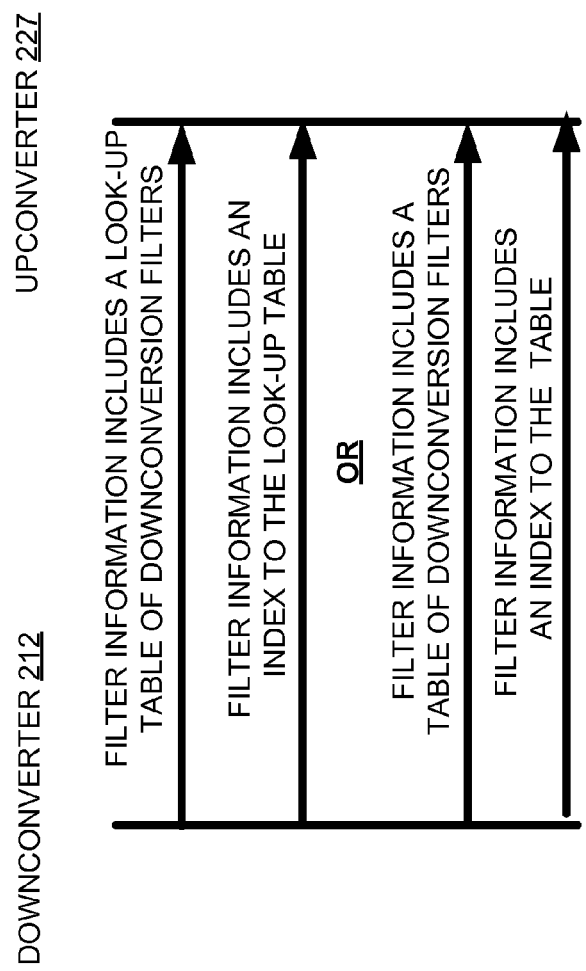

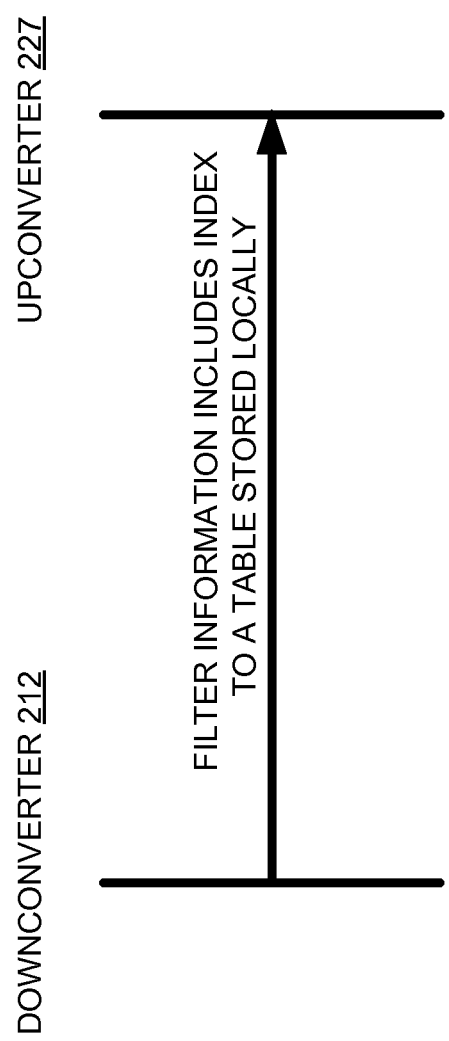

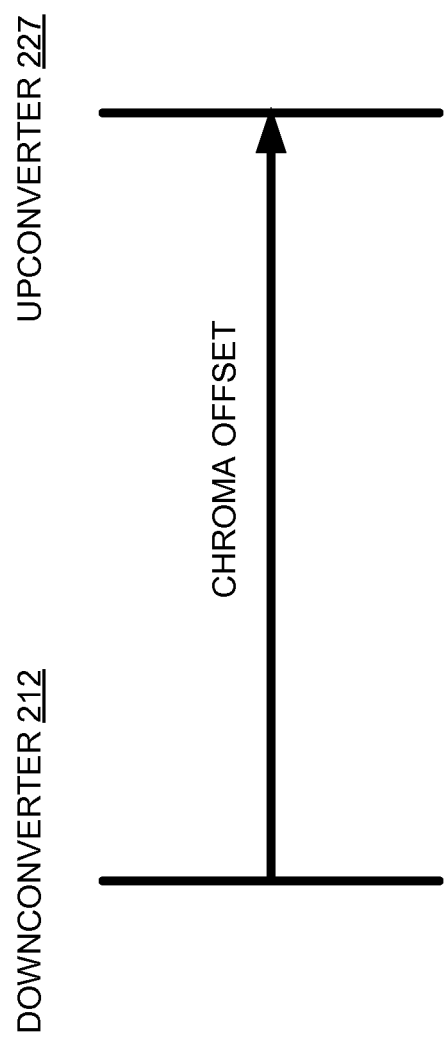

CHROMA INFORMATION SIGNALING FOR VIDEO STREAMS

CROSS-REFERENCE TO RELATED APPLICATIONS

This application is a continuation of U.S. Utility application entitled, "METHODS AND SYSTEMS FOR SIGNALING CHROMA INFORMATION IN VIDEO" having Ser. No. 11/532,415, filed Sep. 15, 2006 (issued U.S. Pat. No. 8,442,124 on May 14, 2013), which is a continuation of U.S. Utility application entitled, "CHROMA CONVERSION OPTIMIZATION," having Ser. No. 10/266,825, filed Oct. 8, 2002 (issued U.S. Pat. No. 7,136,417 on Nov. 14, 2006), which claims priority to U.S. provisional application No. 60/395,969, filed Jul. 15, 2002, all of which are entirely incorporated herein by reference.

TECHNICAL FIELD

The present invention is generally related to compression technology, and, more particularly, is related to chroma processing in subscriber television systems.

BACKGROUND OF THE INVENTION

In implementing enhanced programming in subscriber television systems, the home communication terminal ("HCT"), otherwise known as the set-top box, has become an important computing device for accessing media content services (and media content within those services) and navigating a user through a maze of available services. In addition to supporting traditional analog broadcast video functionality, digital HCTs (or "DHCTs") now also support an increasing number of two-way digital services such as video-on-demand and personal video recording (PVR).

Typically, a DHCT is connected to a cable or satellite, or generally, a subscriber television system, and includes hardware and software necessary to provide the functionality of the digital television system at the user's site. Some of the software executed by a DHCT may be downloaded and/or updated via the subscriber television system. Each DHCT also typically includes a processor, communication components, and memory, and is connected to a television or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

One of the features of the DHCT includes reception of a digital video signal as a compressed video signal. Another feature of the DHCT includes providing PVR functionality through the use of a storage device coupled to the DHCT. When providing this PVR functionality for analog transmission signals, compression is often employed after digitization to reduce the quantity or rate of data, and thus conserve data storage requirements for media content stored in the storage device. Video compression accomplishes this data reduction by exploiting data redundancy in a video sequence (i.e., a sequence of digitized pictures). There are two types of redundancies exploited in a video sequence, namely, spatial and temporal, as is the case in existing video coding standards. A description of some of these standards can be found in the following publications, which are hereby incorporated herein by reference: (1) ISO/IEC International Standard IS 11172-2, "Information technology—Coding of moving pictures and associated audio for digital storage media at up to about 1.5 Mbits/s—Part 2: video," 1993; (2) ITU-T Recommendation H-262 (1996): "Generic coding of moving pictures and associated audio information: Video," (ISO/IEC 13818-2); (3) ITU-T Recommendation H.261 (1993): "Video codec for audiovisual services at p×64 kbits/s"; and (4) Draft ITU-T Recommendation H.263 (1995): "Video codec for low bitrate communications."

One aspect of video signal digitization reduces the data rate of a video signal by performing downconversion of the color information of the video signal. The human eye has less spatial acuity to the color information than to the luminance (brightness) information. A video picture is transmitted with a brightness component (luminance) and two color components (chrominance). The digital representation of a video signal includes a luma signal (Y), representative of brightness, and color difference (or chroma) signals Cb (blue—Y) and Cr (red—Y). Without loss of generality to the specification of a video signal, luminance and luma are used interchangeably in this description as well as chrominance and chroma. The luminance information is often subjected to a non-linear transfer function, such as by a camera, and this process is called gamma correction.

Color formats for these three digitized channels of information, or equivalently the digitized YCbCr video signals, can include several forms to effect a spatial downsampling (or subsampling) of the chroma. These color formats include 4:4:4, 4:2:2, and 4:2:0, as described in ITU-601, which is an international standard for component digital television that was derived from the SMPTE (Society of Motion Picture and Television Engineers) RP1 25 and EBU 3246E standards and which are herein incorporated by reference. ITU-601 defines the sampling systems, matrix values, and filter characteristics for Y, Cb, Cr and red-green-blue (RGB) component digital television. ITU-601 establishes a 4:2:2 sampling scheme at 13.5 MHz for the Y signal and 6.75 MHz for the CbCr signals with eight-bit digitizing for each channel. Certain implementations may process each channel internally with a higher precision than eight bits. These sample frequencies were chosen because they work for both 525-line 60 Hz and 625-line 50 Hz component video systems. The term 4:2:2 generally refers to the ratio of the number of Y signal samples to the number of CbCr signal samples in the scheme established by ITU-601. For every four Y samples, the CbCr signals are each sampled twice. On a pixel basis, this can be restated as for every pixel pair, there is a sample $Y_1$, $Y_2$, and a CbCr shared among the two luma samples. Equal sampling (i.e., $Y_1 CbCr$, $Y_2 CbCr$) at, say 4:4:4, is simply not required for most subscriber television systems due to the reduced visual acuity for color information. Consequently, the 4:2:2 format is an industry standard for input from a digitizer such as an analog video signal decoder and for output to an analog video signal encoder that drives a television display.

MPEG-2 (Motion Pictures Expert Group) main profile uses 4:2:0 color formatting, which reduces transmission bandwidth and data storage requirements, since now for every four luma samples, the CbCr signals are each sampled once. According to ITU-601, the first number of the 4:2:0 color format (i.e., "4") historically represents approximately "4" times the sampling rate for a video signal. The second number (i.e., "2") represents a defined horizontal subsampling with respect to the luma samples. The third number (e.g., "0") represents a defined vertical subsampling (e.g., 2:1 vertical subsampling).

Thus, in the process of digitizing a video signal, the DHCT downconverts the CbCr signal components (or chroma) from the 4:2:2 color format to the 4:2:0 color format using filtering technology well-known in the art to comply to the format required for compression, which also reduces data storage consumption in the storage device. Likewise, a remote compression engine (i.e., remote from the DHCT) may likely have to perform downconversion from the 4:2:2 color format to the 4:2:0 color format using filtering technology. In transitioning from a 4:2:2 color format to a 4:2:0 color format, the chroma signal has to represent a larger pixel sampling area.

Displaying the video pictures on a display device includes the process of receiving a transmitted digital video signal or the process of retrieving the pictures of the video signal from the storage device, decompressing the resultant video signal and reconstructing the pictures in memory, and upconverting the CbCr signal components (or chroma) from the 4:2:0 color format to the 4:2:2 or 4:4:4 color format for eventual display to a display device, or for other processing. Thus, conversion again is needed to reconstruct the color information of the original signal, a process that often reduces picture quality. What is needed is a system that reduces the loss of picture quality (or preserves the picture quality) in the conversion of the chroma.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3B is a schematic diagram that illustrates a default spatial arrangement of 4:2:0 luma and chroma samples for progressive frame pictures, in accordance with one embodiment of the invention.

FIG. 3C is a schematic diagram that illustrates a default spatial arrangement of 4:2:0 luma and chroma samples for interlaced frame pictures, in accordance with one embodiment of the invention.

FIG. 4B is a schematic diagram of two optional chroma offsets for progressive pictures such as those shown in FIG. 3B, in accordance with one embodiment of the invention.

FIGS. 4C-4D are schematic diagrams of optional chroma offsets for interlaced frame pictures such as those shown in FIG. 3C, in accordance with one embodiment of the invention.

FIGS. 9A-9F are timing diagrams that illustrate several embodiments for the transfer of the filter or chroma information via the communication methods illustrated in FIGS. 5-8 from the downconverter of the compression engine to the upconverter of the decompression engine, in accordance with several embodiments of the invention.

FIG. 10 is a timing diagram that illustrates an embodiment for the transfer of chroma information, in accordance with one embodiment of the invention.

DETAILED DESCRIPTION OF THE PREFERRED EMBODIMENTS

Figure 1:
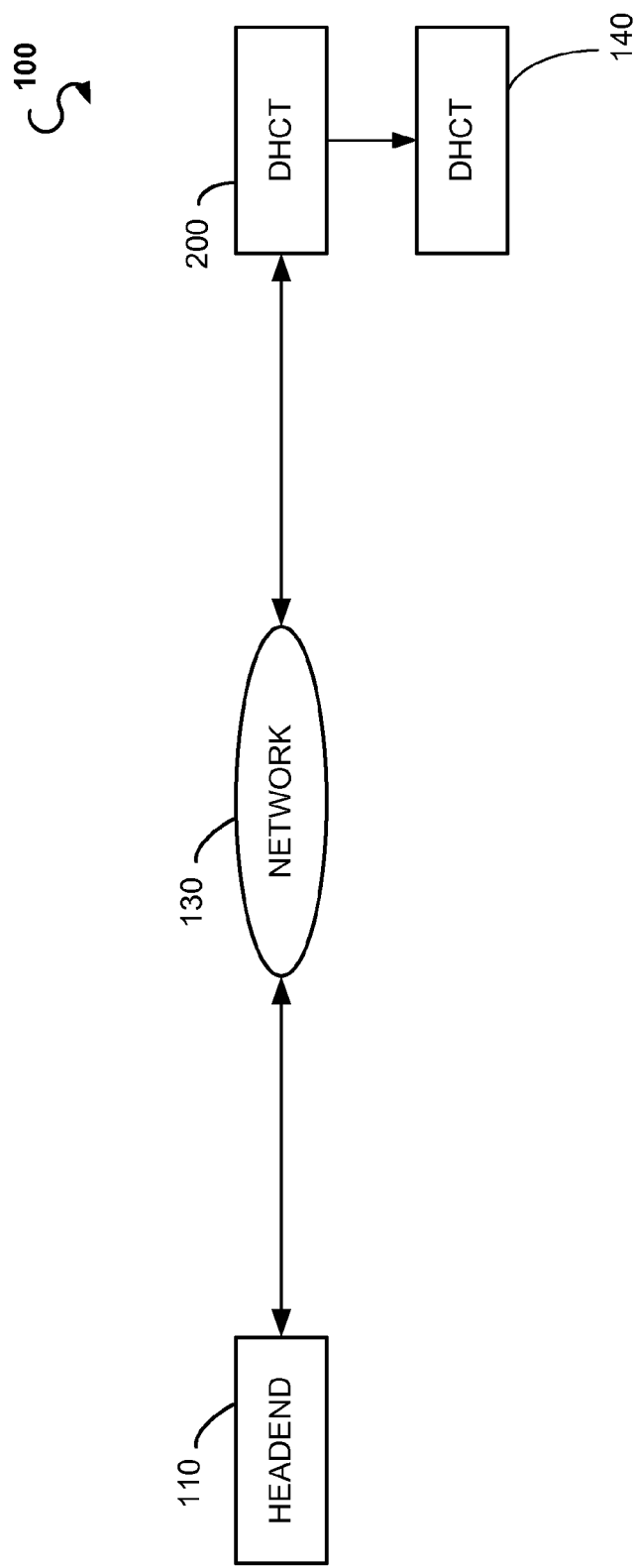
FIG. 1 is a high-level block diagram depicting an example subscriber television system, in accordance with one embodiment of the invention.

The preferred embodiments of the present invention now will be described more fully hereinafter with reference to the accompanying drawings, in which preferred embodiments of the present invention are shown. The preferred embodiments of the present invention can generally be described as including systems and methods that employ up-conversion filters at an upconverter of a decompression engine during upconversion that are optimized to complement (i.e., provide the inverse filter function) the filtering operation performed on the chroma (i.e., the chroma signal components) during the downconversion at a downconverter of a compression engine. The downconversion can be achieved at a digital home communication terminal (DHCT) or remotely, for example at a headend. This optimization can reduce degradation attributed to mismatched interpolation of the chroma in the picture. The YCbCr 4:2:2 color format is the predominant interface and format used for digitized video. It is output by analog video decoders and input by analog video encoders for display.

Most video compression standards such as ISO MPEG-2, ITU H.261 or ITU H.263, however, specify compression of pictures in the YCbCr 4:2:0 color format resulting in downconversion of the chroma to the YCbCr 4:2:0 color format for compression. A decompression engine receives a compressed video stream at its input, then decompresses and reconstructs pictures in memory in the YCbCr 4:2:0 color format. For display, an upconverter of the decompression engine up-converts the reconstructed YCbCr 4:2:0 pictures to the YCbCr 4:2:2 color format. The ITU-656 standard pertains to digitized interlaced video fields specified in YCbCr 4:2:2 color formats. Similar to YCbCr 4:2:2, alternate digitized video formats stem from YCbCr 4:2:2 or require "multicolor channel" information on every line of the picture for display and thus require an interim 4:2:2 or 4:4:4 up-conversion step.

In some instances, a compression engine receives a YCbCr 4:2:2 at its input and employs a YCbCr 4:2:2 to 4:2:0 downconversion filter according to algorithmic preferences and compression goals of the compression engine. A compression engine may further receive progressive pictures or interlaced pictures at its input. When receiving interlaced pictures, the compression engine may employ detection of field replication with what is called inverse telecine detection to detect that the interlaced picture was actually from a progressive camera or scanned from film, and may opt to compress the video signal as a progressive picture. Currently, a decompression engine has no information of which filters were employed by a compression engine for downconversion and must up-convert from the YCbCr 4:2:0 color format to the 4:2:2 color format for display or other processing using a non-optimized general filter. For instance, the filters employed by compression engines from different manufacturers differ due to different strategies of noise reduction and/or chroma downconversion. A compression engine manufacturer may opt to coalesce chroma downconversion and noise reduction filtering. Furthermore, because a picture may be either progressive or interlace originally, depending on the camera, and because a picture may have been transmitted or stored in an alternate form to the scan format produced by the camera, filtering for chroma downconversion may be different. The preferred embodiments of the invention include mechanisms that enable the compression engine to communicate which filters were employed for downconversion (or which filters to employ for upconversion based on the filters used for downconversion), thus addressing some of the aforementioned problems in implementing upconversion.

In other instances, a compression engine is presented with digitized 4:2:0 formatted pictures to compress with a specific chroma sample location relative to the luma samples. Thus, the compression engine does not have to perform downconversion of chroma samples from 4:2:2. This would be the case, for example, when performing a transcode operation from a first compressed video stream format to a second compressed video stream format. For example, a decompression engine is capable of decoding a first compressed video stream format and presents decompressed and reconstructed digitized pictures to the input of a compression engine for compression. To avoid any further degradation of the chroma, the compression engine forgoes downconversion of the chroma (according to a second compressed video stream format) and retains the original specification of chroma displacement relative to luma samples (of the first compressed video stream format). The retained specification is signaled in the compressed video stream with a chroma position flag.

The preferred embodiments of the invention also include systems and methods to inform the decompression engine (or rather, the upconverter of the decompression engine) of chroma information such as chroma offsets relative to luma samples or of which filters were used by the compression engine (or rather, the downconverter of the compression engine) for downconversion of the chroma using a new field in the group of pictures (GOP) header, sequence header, and/or picture header, for example as an extension header. As a result, the upconverter of the decompression engine employs upconversion filters for chroma information that are tailored for the specified position of the chroma samples relative to luma samples, or optimized to match the complement of the downconversion filters used to perform the downconversion by the video compression engine, and/or to match the scan format for the display device it is driving, either progressive or interlace, for example, such that degradation attributed to chroma information interpolation in the picture is reduced.

For example, a 4:2:0 color format not only specifies fewer chroma samples than a 4:2:2 color format, but also chroma samples that may or may not be co-located with any of the chroma samples in the 4:2:2 color format required for, say, display. Consequently, the chroma offset assists in specifying the actual location of the chroma samples in the 4:2:0 color format in compressed video pictures. Assuming "normal" picture reconstruction and "normal" display, a first compressed video stream may comprise chroma samples in a 4:2:0 color format that are co-located with half of the chroma samples of the 4:2:2 color format required for display. In such a case, the decompressed chroma samples may be employed as half of the chroma samples in the 4:2:2 color format required for display. In a second compressed video stream, none of the chroma samples in the 4:2:0 color format are co-located with the chroma samples in the 4:2:2 color format required for display.

In one embodiment, a table specifies a suite of filter sets, each set with a respective number of filters and each with a respective number of taps and tap values. The set of filters can be standardized in a video compression standard such as H.26L, for example, so that a simple token (e.g., a field including a small finite number of bits) in the compressed video stream can notify the decompression engine which in the predefined set of filters to use in the upconversion of chroma. Alternatively, the table can be transmitted as part of the header of the picture sequence level, as a sequence extension, in the (GOP) layer, as part of the picture header or picture coding extension, as part of picture display extension, as part of the slice layer, as MPEG-2 private data, and/or as user data. In one embodiment, the table can be transmitted exclusively in one of the aforementioned levels or layers of the compressed video stream. In an alternate embodiment, the table is transmitted in one or more of the levels and layers of the stream. An element specified to carry data or a parameter set can serve as a vehicle to carry the chroma information or in general, sufficient information required for a decompression engine to implement an optimized chroma upconversion operation, and thus a table is not a limitation of the preferred embodiments, nor is the specification of one or more filters. That is, in one embodiment, sufficient chroma information may merely include the location of the chroma samples relative to the luma samples in the picture. The upconverter implements upconversion filters for the specified chroma information. Preferably, the table includes, not the filters employed by the downconverter, but those filters that are to be used by the upconverter for chroma upconversion or the chroma offsets implied by the filters. Other embodiments will be described below, including a table that includes filters employed by the downconverter.

In one embodiment, according to the downconversion filters it employs, a downconverter specifies an upconversion filter for chroma upconversion for odd fields and an upconversion filter, that may or may not be the same upconversion filter used for the odd fields, for even fields to be used by the upconverter in a finite size field in a header. The upconverter thus has a table of filters for chroma upconversion at its disposition. A compressed video stream can specify in a finite size field the index into the table for the filter to be used for the odd fields and the index for the filter to be used for the even fields to upconvert the chroma. Alternatively, a single index may specify both filters. The downconverter specifies upconversion filters that are optimized to complement the filters used in the downconversion of the chroma information. Alternatively, the downconverter specifies the chroma offsets implied by the upconversion filters that are optimized to complement the filtering involved in the downconversion of the chroma.

When downconversion filtering is employed and the compressed video stream carries chroma offset information, the specified chroma offset implies the upconversion filter(s) to be employed by the upconverter. The implied upconversion filtering by the chroma offset is intended for "normal" picture reconstruction and "normal" display. If the decompressed picture is displayed at a different picture size than the compressed picture size, then the upconverter uses the chroma offset information in the process of simultaneously resizing and upconverting to a 4:2:2 color format for the decompressed pictures. Thus, the implied upconversion filter by the chroma offset may differ when resizing the decompressed picture. For instance, a compressed video stream may comprise of standard pictures that need to be upscaled in size for display in a high definition TV (HDTV).

If the decompressed picture is displayed in a different display device than the inherent compressed picture type, then the upconverter uses the chroma offset information in the process of simultaneous picture type conversion and upconverting to a 4:2:2 color format for the decompressed pictures. For instance, when the compressed picture is an interlaced picture but the display device is a progressive display device, the interlaced pictures will be converted to progressive pictures for display. Note that when a chroma offset is specified, it will be understood that one chroma offset may be specified for top fields that may or may not be different than the chroma offset specified for the bottom fields.

In other embodiments, the chroma offsets relative to the luma samples are specified regardless of which downconversion filters were employed to generate the 4:2:0 downconversion and regardless of whether downconversion from 4:2:2 to 4:2:0 was performed at all. For instance, downconversion to 4:2:0 may not be performed at all when the digitized video signal presented at the input of the compression engine is already in 4:2:0 format. A digitized video signal may already be in a 4:2:0 color format for any of multiple reasons, such as for a transcoding operation, as explained further below.

Downconversion (also known as subsampling or downsampling) will herein be used to refer to, among other things, the change in color format in a video signal from a first color format to a second color format in which the number of chroma samples relative to luma samples in the first color format is higher than in the second color format. Similarly, upconversion (also known as upsampling) will herein be used to refer to, among other things, the change in color format in a video signal from a first color format to a second color format in which the number of chroma samples relative to luma samples in the second color format is higher than in the first color format.

Figure 2:
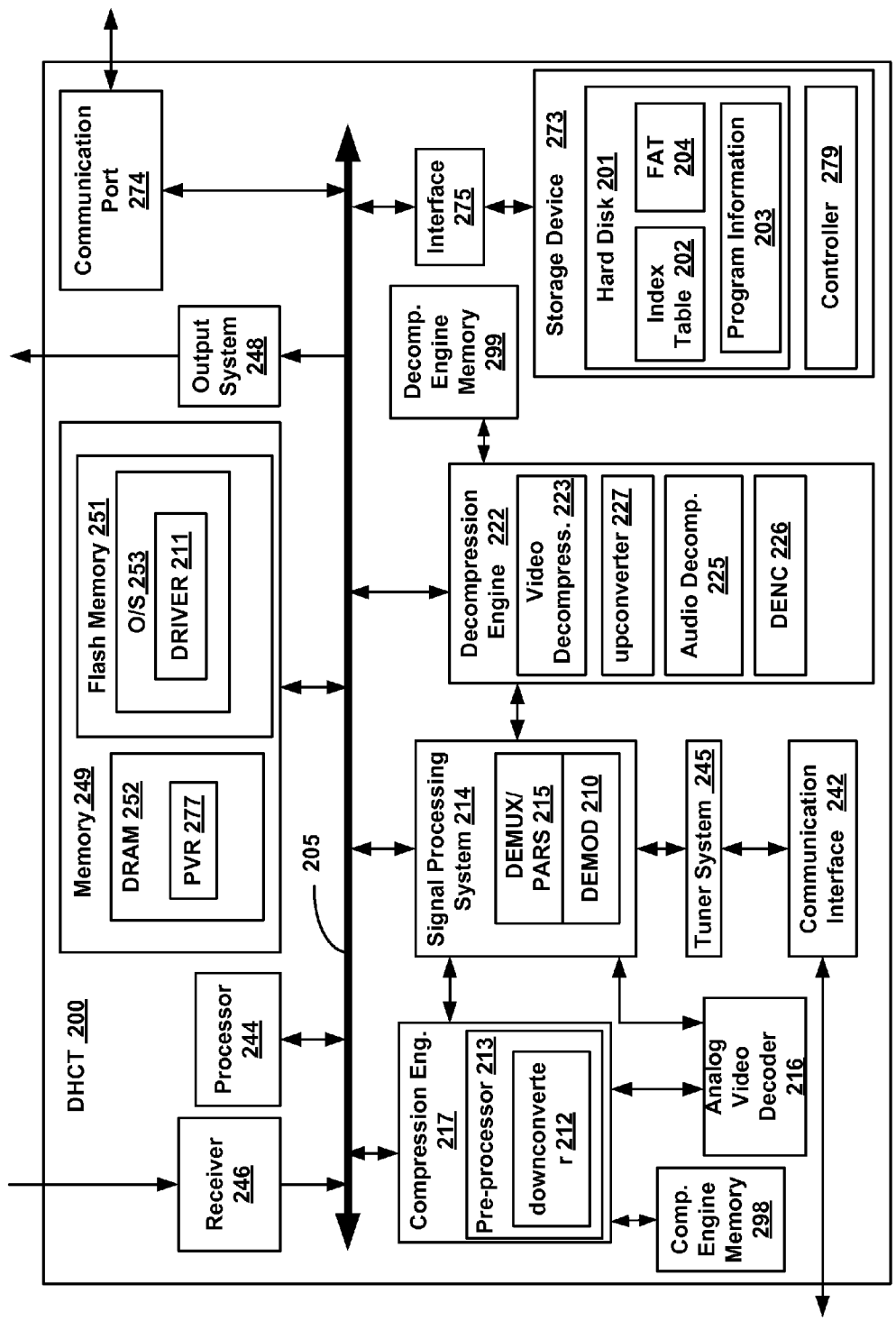
FIG. 2 is a block diagram of an example digital home communication terminal (DHCT) as depicted in FIG. 1 and related equipment, in accordance with one embodiment of the invention.
Figure 3A:
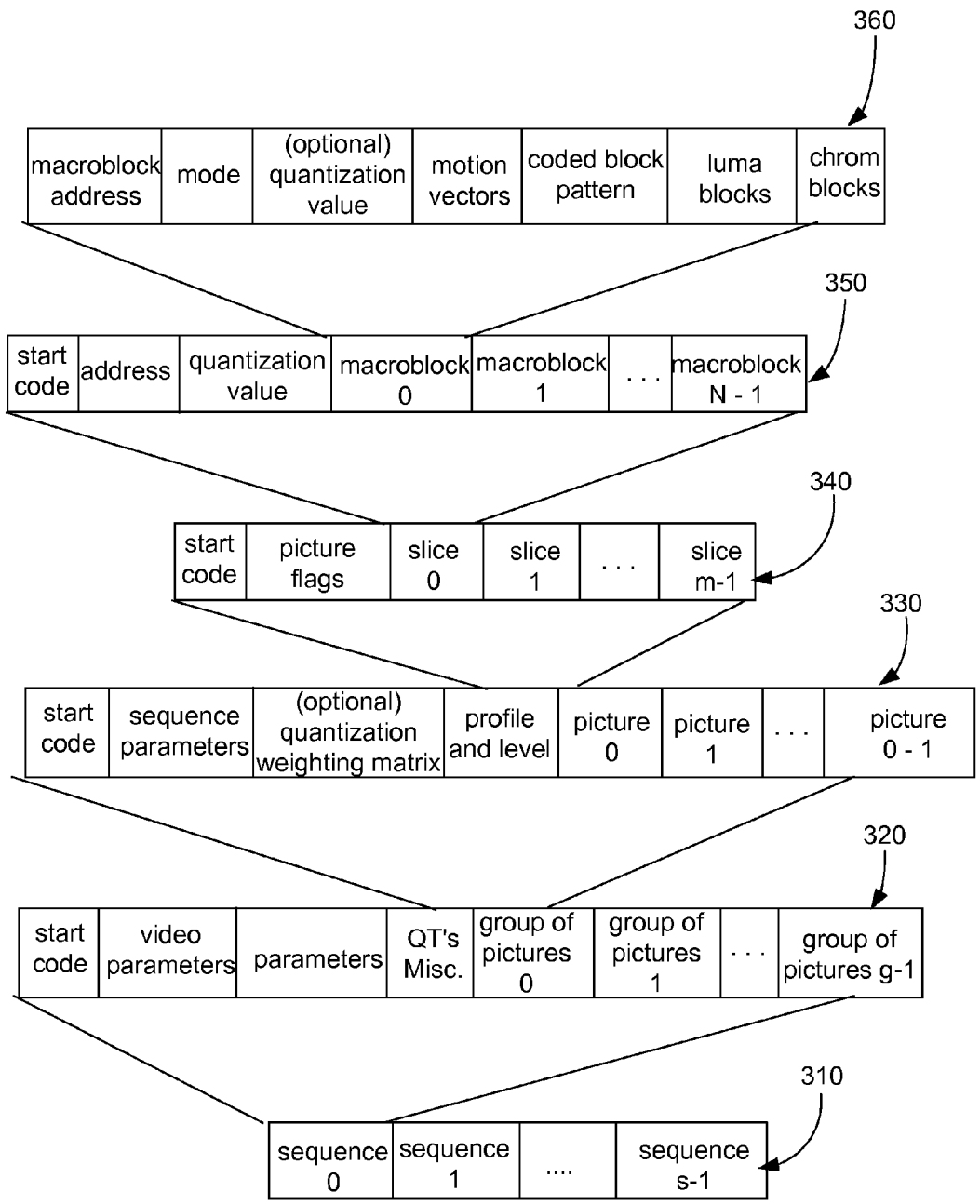
FIG. 3A is a schematic diagram that represents the hierarchy of a Motion Pictures Expert Group (MPEG) video stream as output by a compression engine and received by a decompression engine, with the highest layer shown at the bottom and the lowest layers shown at the top, in accordance with one embodiment of the invention.
Figure 4A:
FIG. 4A is a parameter set used to designate chroma locations in progressive and interlaced frame pictures, in accordance with one embodiment of the invention.

FIGS. 1-2 will provide an overview of an example system in which downconversion and upconversion can be implemented. FIG. 3A will provide an illustration of a hierarchical structure for an MPEG-2 video signal, with the default chroma sample locations further delineated in FIGS. 3B and 3C, and optional locations for the chroma samples shown in FIGS. 4B-4D. FIG. 4A shows one example mechanism to designate chroma sample locations. FIGS. 5-8 will illustrate several methods for communicating filter or chroma information from the downconverter to the upconverter, and FIGS. 9A-9F and FIG. 10 will provide illustrations of what the filter or chroma information includes in different implementations. The preferred embodiments of the present invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among other examples contemplated but not shown.

FIG. 1 is a block diagram that depicts an example subscriber television system (STS) 100. In this example, the STS 100 includes a headend 110 and a DHCT 200 that are coupled via a network 130. The DHCT 200 is typically situated at a user's residence or place of business and may be a stand-alone unit or integrated into another device such as, for example, a display device 140 or a personal computer (not shown), among other devices. The DHCT 200 receives signals (video, audio and/or other data) including, for example, digital video signals in a compressed representation of a digitized video signal such as compressed MPEG-2 streams modulated on a carrier signal, and/or analog information modulated on a carrier signal, among others, from the headend 110 through the network 130, and provides reverse information to the headend 110 through the network 130.

The network 130 may include any suitable medium for communicating television services data including, for example, a cable television network or a satellite television network, among others. The headend 110 may include one or more server devices (not shown) for providing video, audio, and textual data to client devices such as the DHCT 200. The headend 110 and the DHCT 200 cooperate to provide a user with television services including, for example, television programs, an interactive program guide (IPG), and/or video-on-demand (VOD) presentations, among others. The television services are presented via the display device 140, which is typically a television set that, according to its type, is driven with an interlaced scan video signal or a progressive scan video signal. However, the display device 140 may also be any other device capable of displaying video images including, for example, a computer monitor. Further note that although shown communicating with a display device 140, the DHCT 200 can communicate with other devices that receive and store and/or process the signals from the DHCT 200.

FIG. 2 is a block diagram that illustrates selected components of a DHCT 200, in accordance with one embodiment of the present invention. It will be understood that the DHCT 200 shown in FIG. 2 is merely illustrative and should not be construed as implying any limitations upon the scope of the invention. For example, in another embodiment, the DHCT 200 may have fewer, additional, and/or different components than the components illustrated in FIG. 2. A DHCT 200 is typically situated at a user's residence or place of business and may be a stand alone unit or integrated into another device such as, for example, a television set or a personal computer. The DHCT 200 preferably includes a communications interface 242 for receiving signals (video, audio and/or other data) from the headend 110 (FIG. 1) through the network 130 (FIG. 1), and provides reverse information to the headend 110.

The DHCT 200 further preferably includes at least one processor 244 for controlling operations of the DHCT 200, an output system 248 for driving the television display 140 (FIG. 1), and a tuner system 245 for tuning to a particular television channel and/or frequency and for sending and receiving various types of data to/from the headend 110 (FIG. 1). The DHCT 200 may include, in other embodiments, multiple tuners for receiving downloaded (or transmitted) data. The tuner system 245 can select from a plurality of transmission signals provided by the subscriber television system 100 (FIG. 1). The tuner system 245 enables the DHCT 200 to tune to downstream media and data transmissions, thereby allowing a user to receive digital and/or analog media content via the subscriber television system 100. The tuner system 245 includes, in one implementation, an out-of-band tuner for bi-directional quadrature phase shift keying (QPSK) data communication and one or more quadrature amplitude modulation (QAM) tuners (in band) for receiving television signals. Additionally, a receiver 246 receives externally-generated user inputs or commands from an input device such as, for example, a remote control device (not shown).

The DHCT 200 may include one or more wireless or wired interfaces, also called communication ports 274, for receiving and/or transmitting data to other devices. For instance, the DHCT 200 may feature USB (Universal Serial Bus), Ethernet, IEEE-1394, serial, and/or parallel ports, etc. The DHCT 200 may also include an analog video input port for receiving analog video signals. User input may be provided via an input device such as, for example, a handheld remote control device or a keyboard.

The DHCT 200 includes a signal processing system 214, which comprises a demodulating system 210 and a transport demultiplexing and parsing system 215 (herein demultiplexing system) for processing broadcast media content and/or data. One or more of the components of the signal processing system 214 can be implemented with software, a combination of software and hardware, or preferably in hardware. The demodulating system 210 comprises functionality for demodulating analog or digital transmission signals. For instance, the demodulating system 210 can demodulate a digital transmission signal in a carrier frequency that was modulated, among others, as a QAM-modulated signal. When tuned to a carrier frequency corresponding to an analog TV signal, the demultiplexing system 215 is bypassed and the demodulated analog TV signal that is output by the demodulating system 210 is instead routed to an analog video decoder 216. The analog TV signal can be presented to the input of the analog video decoder 216, in one implementation, as a non-compressed video signal having a 4:2:2 color format. The analog video decoder 216 converts the analog TV signal into a sequence of digitized pictures in interlaced scan format and their respective digitized audio. Digitized pictures and respective audio output by the analog video decoder 216 are presented at the input of a compression engine 217.

The compression engine 217 processes the sequence of digitized pictures and digitized audio and converts them into compressed video and audio streams, respectively. The compression engine 217 preferably includes an ITU-656 port that accepts digitized non-compressed signals in the 4:2:2 color format. The compression engine 217 includes a pre-processor 213 that provides for low pass filter functionality and scaling functionality, as well as other components and/or functionality that are employed to reduce the effects of noise, film grain, aliasing, and/or other artifacts that can degrade picture quality. The pre-processor 213 also includes a downconverter 212.

The downconverter 212 employs one or more filters to perform downconversion of the chroma signal components (Cb and Cr) (or chroma) from the 4:2:2 color format to the 4:2:0 color format. The filters are generally characterized by the number of taps (i.e., coefficients), tap values, indications of whether the filter or filters are to be applied to the top or bottom field of an interlaced frame, and the bit rate. The filters may be designed to enforce a certain phase-shift (e.g., offset) in the chroma information in one type of field and a different phase-shift in the opposite field. For instance, a quarter pixel phase-shift may be imposed in the top field toward the top direction and a quarter pixel phase-shift may be imposed in the bottom field toward the bottom direction. Alternatively, no phase-shift may be imposed at all. In one embodiment, upon detection of a picture that was originally progressive rather than interlaced (e.g., via inverse telecine detection), different filters are applied. Note that a chroma phase-shift is equivalent to an offset of the location of the chroma sample in the spatial domain of the picture relative to the location of the luma samples. For example, a chroma sample located at the midway point between the center of two vertically-aligned luma samples is said to have a phase-shift, or offset, of 0.5 pixels in the vertical orientation with respect to the luma samples.

In one implementation, a suite of filters (not shown) can be maintained in memory 249, such as DRAM 252 or FLASH memory 251, or preferably in compression engine memory 298, which is preferably dedicated to the compression engine 217, that is either externally coupled to the compression engine 217 (as shown) or integrated within the compression engine 217 in other embodiments. The suite of filters are preferably stored in a data structure such as a data table. The filters can also be stored in a storage device 273 in other embodiments. Further, in a preferred embodiment, complement filters that are characterized as being an inverse function of the filters employed by the downconverter 212 can be maintained in memory 249, for use by an upconverter 227 of a decompression engine 222 when implementing upconversion of the 4:2:0 color formatted signal to a 4:2:2 color format for display, as one example, as will be described below. Preferably, the complement filters are stored in a data structure in a decompression engine memory 299, which is dedicated to the decompression engine 222, that is either externally coupled to the decompression engine 222 (as shown) or integrated within the decompression engine 222 in other embodiments, and in yet other embodiments can be stored in memory 249. Note that the decompression engine memory 299 is also used for digital compressed streams received from the headend 11.

The compressed video and audio streams are produced in accordance with the syntax and semantics of a designated audio and video coding method, such as, for example, MPEG-2, so that they can be interpreted by the decompression engine 222 for decompression, upconversion, and reconstruction at a future time. Each compressed stream consists of a sequence of data packets containing a header and a payload. Each header contains a unique packet identification code, or PID, associated with the respective compressed stream.

The compression engine 217 multiplexes the audio and video compressed streams into a transport stream, such as an MPEG-2 transport stream. Furthermore, compression engine 217 can preferably compress audio and video corresponding to more than one program in parallel (e.g., two tuned analog TV signals when DHCT 200 has multiple tuners) and to multiplex the respective audio and video compressed streams into a single transport stream. The output of compressed streams and/or transport streams produced by the compression engine 217 is input to a signal processing system 214. Parsing capabilities of the demultiplexing system 215 allow for interpretation of sequence and picture headers, and in a preferred embodiment, annotating their locations within their respective compressed stream as well as other useful information for future retrieval from storage device 273, as described below. A compressed analog video stream (e.g., corresponding to a TV program episode or show) that is received via a tuned analog transmission channel can be output as a transport stream by the signal processing system 214 and presented as input for storage in the storage device 273 via interface 275. The packetized compressed streams can be also output by the signal processing system 214 and presented as input to the decompression engine 222.

The decompression engine 222 includes a video decompressor 223 and an audio decompressor 225 for video and audio decompression, respectively. The decompression engine 222 also includes an upconverter 227 to provide upconversion of the chroma of the video signal from the 4:2:0 color format to the 4:2:2 color format. The upconverter 227 is preferably located in the display pipeline, the display portion, or the post-processing stage of the decompression engine 222, and is preferably implemented as a state machine. In other embodiments, the upconverter 227 can operate in cooperation with a processor or a digital signal processor (DSP) (not shown) that is integrated in the decompression engine 222. The upconverter 227 employs one or more upconversion filters for performing the upconversion from the 4:2:0 color format to the 4:2:2 color format. The decompression engine 222 also includes a digital encoder (DENC) 226, that provides an analog signal from the digital, non-compressed 4:2:2 video signal received from the upconverter 227 to a display device 140 (FIG. 1).

The demultiplexing system 215 can include MPEG-2 transport demultiplexing. When tuned to carrier frequencies carrying a digital transmission signal, the demultiplexing system 215 enables the separation of packets of data, corresponding to the desired video streams, for further processing. Concurrently, the demultiplexing system 215 precludes further processing of packets in the multiplexed transport stream that are irrelevant or not desired, such as packets of data corresponding to other video streams.

The components of the signal processing system 214 are preferably capable of QAM demodulation, forward error correction, demultiplexing of MPEG-2 transport streams, and parsing of packetized elementary streams and elementary streams. The signal processing system 214 further communicates with the processor 244 via interrupt and messaging capabilities of the DHCT 200. The processor 244 annotates the location of pictures within the compressed stream as well as other pertinent information. The annotations by the processor 244 enable normal playback or other playback modes of the stored compressed stream of the respective compressed stream.

A compressed video stream corresponding to a tuned carrier frequency carrying a digital transmission signal can be output as a transport stream by the signal processing system 214 and presented as input for storage in the storage device 273 via interface 275. In one embodiment, the compressed video stream comprises information to inform the decompression engine which set of filters or offsets to use in the upconversion of the chroma. The packetized compressed streams can be also output by the signal processing system 214 and presented as input to the decompression engine 222 for audio and/or video decompression.

One having ordinary skill in the art will appreciate that the signal processing system 214 may include other components not shown, including memory, decryptors, samplers, digitizers (e.g., analog-to-digital converters), and multiplexers, among others. Further, other embodiments will be understood, by those having ordinary skill in the art, to be within the scope of the preferred embodiments of the present invention. For example, analog signals (e.g., NTSC) may bypass one or more elements of the signal processing system 214 and may be forwarded directly to the output system 248. Outputs presented at corresponding next-stage inputs for the aforementioned signal processing flow may be connected via accessible DRAM 252 in which an outputting device stores the output data and from which an inputting device retrieves it. Outputting and inputting devices may include the analog video decoder 216, the compression engine 217, the decompression engine 222, the signal processing system 214, and components or sub-components thereof.

The demultiplexing system 215 parses (i.e., reads and interprets) compressed streams to interpret sequence headers and picture headers, and deposits a transport stream carrying compressed streams into DRAM 252. The processor 244 causes the transport stream to be transferred from DRAM 252 to the storage device 273 via interface 275. Upon effecting the demultiplexing and parsing of the transport stream carrying one or more video streams, the processor 244 interprets the data output by the signal processing system 214 and generates ancillary data in the form of a table or data structure (index table 202) comprising the relative or absolute location of the beginning of certain pictures in the compressed video stream. Such ancillary data is used to facilitate the retrieval of desired video data during future operations.

In one embodiment of the invention, a plurality of tuners and respective demodulating systems 213, demultiplexing systems 215, and signal processing systems 214 may simultaneously receive and process a plurality of respective broadcast digital video streams. Alternatively, a single demodulating system 213, a single demultiplexing system 215, and a single signal processing system 214, each with sufficient processing capabilities, may be used to process a plurality of digital video streams.

In yet another embodiment, a first tuner in tuning system 245 receives an analog video signal corresponding to a first video stream and a second tuner simultaneously receives a digital compressed stream corresponding to a second video stream. The first video stream is converted into a digital format. The second video stream and/or a compressed digital version of the first video stream are routed to a hard disk 201 of the storage device 273. Data annotations for the two streams are performed to facilitate future retrieval of the video streams from the storage device 273. The first video stream and/or the second video stream may also be routed to decompression engine 222 for decompression, upconversion, and reconstruction, and subsequent presentation via the display device 140 (FIG. 1). The first video stream may be routed to the decompression engine 222 in either a digital or analog format.

In one implementation, the compression engine 217 can output formatted MPEG-2 or MPEG-1 packetized elementary streams (PES) inside a transport stream, all compliant to the syntax and semantics of the ISO MPEG-2 standard. Alternatively, the compression engine 217 can output other digital formats that are compliant to other standards. The digital compressed streams output by the compression engine 217 corresponding to a video stream are routed to the demultiplexing system 215. The demultiplexing system 215 parses (i.e., reads and interprets) the transport stream generated by the compression engine 217 without disturbing its content and deposits the transport stream into DRAM 252. The processor 244 causes the transport stream in DRAM 252 to be transferred to the storage device 273. In a preferred embodiment, while parsing the transport stream, the demultiplexing system 215 outputs to DRAM 252 ancillary data in the form of a table or data structure comprising the relative or absolute location of the beginning of certain pictures in the compressed media content stream for the video stream for facilitating retrieval during future operations. In this way, random access operations such as fast forward, rewind, and jumping to a location in the compressed video stream can be achieved. Additional pertinent data is also written in the tables, as described below.

In some embodiments, a plurality of compression engines 217 may be used to simultaneously compress a plurality of analog video streams. Alternatively, a single compression engine 217 with sufficient processing capabilities may be used to compress a plurality of digitized analog video signals presented at its input. Compressed digital versions of respective analog video streams may be routed to the hard disk 201 of the storage device 273. Data annotations for each of the video streams may be performed to facilitate future retrieval of the video streams from the storage device 273. Depending on requirements in effect at an instance of time, only a subset of the total number of compressed digital video signals may be routed to the storage device 273. Any of the received video streams can also be routed simultaneously to the decompression engine 222 for decoding, encoding, and subsequent presentation via the display device 140 (FIG. 1).

In one embodiment, the compression engine 217 records filter information for upconversion of the chroma in respective data annotations for each video stream. In this way, in a self-contained system wherein the compression engine 217 and the decompression engine 222 co-exist (such as where both components are resident in the DHCT 200), and the decompression engine 222 is the sole consumer of compressed video streams produced by the compression engine 217, the data annotations allow the decompression engine 222 to decompress and display optimized picture quality for respective compressed video streams. The decompression engine 222 is programmed to employ corresponding filters for upconversion of the chroma when sourcing a compressed video stream produced by the compression engine 217.

When sourcing other compressed video streams, such as those received from a tuned digital channel where the stream was compressed externally to the DHCT 200, the decompression engine 222 has no specific knowledge of how the downconversion of the chroma was performed and thus proceeds, in one embodiment, to perform ordinary chroma upconversion according to a chroma specification (that can be optionally followed) without auxiliary chroma upconversion information.

The DHCT 200 includes at least one storage device 273 for storing video streams received by the DHCT 200. A PVR application 277, in cooperation with the operating system 253 and the device driver 211, effects, among other functions, read and/or write operations to/from the storage device 273. Herein, references to write and/or read operations to the storage device 273 will be understood to include operations to the medium or media of the storage device 273 unless indicated otherwise. The device driver 211 is a software module preferably resident in the operating system 253. The device driver 211, under management of the operating system 253, communicates with the storage device controller 279 to provide the operating instructions for the storage device 273. As conventional device drivers and device controllers are well known to those of ordinary skill in the art, further discussion of the detailed working of each will not be described further here.

The storage device 273 is preferably internal to the DHCT 200, coupled to a common bus 205 through a communication interface 275. The communication interface 275 is preferably an integrated drive electronics (IDE) or small computer system interface (SCSI), although another interface such as, for example, IEEE-1394 or universal serial bus (USB), among others, may be used. Alternatively, the storage device 273 can be externally connected to the DHCT 200 via a communication port 274. The communication port 274 may be, for example, an IEEE-1394, a USB, a SCSI, or an IDE. In one implementation, video streams are received in the DHCT 200 via communications interface 242 and stored in a temporary memory cache (not shown). The temporary memory cache may be a designated section of DRAM 252 or an independent memory attached directly to a communication interface 242. The temporary cache is implemented and managed to enable media content transfers to the storage device 273. In one implementation, the fast access time and high data transfer rate characteristics of the storage device 273 enable media content to be read from the temporary cache and written to the storage device 273 in a sufficiently fast manner. Multiple simultaneous data transfer operations may be implemented so that while data is being transferred from the temporary cache to the storage device 273, additional data may be received and stored in the temporary cache.

FIG. 3A is a schematic diagram that represents the hierarchy of the elements in an MPEG-2 video stream as output by the compression engine 217 (FIG. 2), with the highest layer shown at the bottom and the lowest layers shown at the top. It will be understood that this is one example hierarchy, and that others that are specified according to the syntax and semantics of the employed codec definition, such as MPEG-4, H.26L, etc., are contemplated to be within the scope of the preferred embodiments of the invention. A sequence of pictures 310 will comprise a sequence layer 320, with the sequence layer comprising groups of pictures. Further delineating the next level of the hierarchy of the elements in an MPEG-2 video stream is the group of pictures (GOP) layer 330, which includes a series of pictures. Each picture can further be broken sown as a picture layer 340 that includes a series of slices, which in turn leads to the next higher layer (the slice layer 350) which includes a series of macroblocks. The macroblocks comprise a macroblock layer 360 that includes, among other elements, luma and chroma blocks. A similar hierarchy of layers exist for other video compression methodologies such as MPEG-4 video and H.26L video (currently in draft form and likely to be named H.264).

The sequence layer 320, the GOP layer 330, the picture layer 340, and the slice layer 350 all begin with a start code that enables accessing of the media content from the storage device 273 (FIG. 2) at the beginning of these substreams of the MPEG video stream. The sequence layer 320 includes a sequence header (not shown) that includes such information as picture rate, profile and level indication, image aspect ratio, and interlace and progressive sequence indication. The sequence header is preferably after a start code, or more generally, is part of the compressed video stream as defined by the syntax and semantics of the compressed video format that is implemented. The headers (and extension to the headers) for the sequence layer 320, the GOP layer 330, and the picture layer 340 can also be used to carry filter or chroma information from the downconverter 212 (FIG. 2) to the upconverter 227 (FIG. 2), according to a preferred embodiment of the invention, and described further below. The GOP layer 330 includes a group of I, P, and/or B pictures of varying order. The compression engine 217 arranges the frames in the bitstream such as to eliminate dependencies (e.g., such that I pictures are not dependent on any other picture).

The picture layer 340 includes a series of slices that comprise a frame. The picture layer header (not shown) includes several parameters, such as the picture type (e.g., I, P, etc.), a temporal reference that indicates the position within the group of pictures with respect to the initially transmitted signal, and a progressive or interlaced scan format indication for the picture. The slice layer 350 includes a series of macroblocks that constitutes a subset of the picture. As is well known in the art, MPEG-2 divides the picture into areas called macroblocks, each representing a non-overlapping squared region of 16 by 16 luma pixels.

Different compression methodologies may employ different compression tools, different size blocks or macroblocks, and different slice definitions. For instance, a slice in a compression methodology could possibly span the whole picture or comprise of macroblocks that are not adjacent in a sequential raster scan order.

In one implementation, the compression engine 217 (FIG. 2) is presented pictures in 4:2:2 format at its input by the analog video decoder 216 (FIG. 2). However, the analog video decoder 216 is typically manufactured to provide 4:2:2 formatted data for interlaced pictures, or in fields, to be presented to the output system 248 for output and display on an interlaced TV. However, since most of the MPEG-2 Profiles use a 4:2:0 color format, which generally involves the process in which, as described above, the chroma presented at the input to the compression engine 217 is downsampled from 4:2:2 by a factor of two in the y axis. The compression engine 217 or a compression engine that produced a video stream received as a digital video channel from the headend 110 (FIG. 1) employs filters based on signal processing principles to convert to a 4:2:0 representation of the 4:2:2 digitized video signal suitable for video compression. MPEG-2 video compression requires the chroma sample be located at the edge between the left luma samples in every pair of non-overlapping consecutive rows, as explained below.

Consequently, downconversion filters in the compression engine 217 will perform the downconversion from 4:2:2 formatted pictures received at its input to the specified 4:2:0. The compression engine 217 or a remote compression engine compresses pictures as progressive frame pictures or frames or as interlaced frame pictures (i.e., fields) according to its programmed compression strategy (frame pictures, as is understood in the art, include picture elements (or pixels). Each picture element is specified by the values of chroma and luma samples). For instance, a compression engine that detects that the interlaced frame picture presented at its input was actually from a progressive camera or scanned from film may opt to compress the video signal as a progressive picture.

For compression of progressive frame pictures, the chroma downconversion filters employed by one compression engine (e.g., a compression engine manufactured by one manufacturer, or one model of a manufacturer) tends to differ from those implemented by another compression engine (e.g., a compression engine of another manufacturer or of a different model by the same manufacturer) according to their respective strategies that comprise the level of desired noise reduction, the target bit-rate for the compressed video stream, compression mode (e.g., constant bit rate, variable bit rate, etc.), and/or whether downscaling of the picture spatial dimensions is effected. Consequently, chroma downconversion filters differ among compression engines. Similarly, upconversion filters may differ among decompression engines, such as due to picture resizing requirements, color temperature differences, among other reasons.

Current recommendations and/or international standards support the coding of color sequences using 4:2:0 color formats. The recommendations and/or international standards describe the coding of video that includes either progressive frame pictures or interlaced frame pictures, which may be mixed together in the same sequence. FIG. 3B is a schematic diagram that illustrates an excerpt of the top-left corner of a progressive frame picture showing the default vertical and horizontal locations of 4:2:0 luma and chroma samples in the spatial domain. The "X's" denote the locations of the luma samples, and the "O's" denote the locations of the chroma samples. Half line and half column increments are shown to depict the position of the chroma samples. The image width and height of the decoded luma memory arrays are preferably multiples of 16 samples. The decoder output picture sizes that are not a multiple of 16 in width or height can be specified using a cropping rectangle.

FIG. 3C illustrates the default location of chroma samples for the top fields 306 and bottom fields 307 of an interlaced frame picture in the spatial domain. The "X's" denote the locations of the luma samples, and the "O's" denote the locations of the chroma samples. A frame of video includes two fields, the top field 306 and the bottom field 307, which are interleaved. The first (i.e., top), third, fifth, etc. lines of a frame are the top field lines. The second, fourth, sixth, etc. lines of a frame are the bottom field lines. A top field picture consists of only the top field lines of a frame. A bottom field picture consists of only the bottom field lines of a frame. The two fields of an interlaced frame are separated in time. They may be coded separately as two field pictures or together as a frame picture. A progressive frame should be coded as a single frame picture. However, a progressive frame is still considered to include two fields (at the same instant in time) so that other field pictures may reference the sub-fields of the frame.

The vertical sampling positions of the chroma samples in a top field 306 of an interlaced frame are specified as shifted up by a ¼ luma sample height relative to the field-sampling grid in order for these samples to align vertically to the usual position relative to the full-frame sampling grid. The vertical sampling positions of the chroma samples in a bottom field 307 of an interlaced frame are specified as shifted down by ¼ luma sample height relative to the field-sampling grid in order for these samples to align vertically to the usual position relative to the full-frame sampling grid. The horizontal sampling positions of the chroma samples are specified as unaffected by the application of interlaced field coding.

Although the default and encouraged vertical and horizontal locations of luma and chroma samples are as shown in FIGS. 3B and 3C, signaling of optional chroma locations in a group of pictures (GOP) Parameter Set is possible. FIG. 4A shows an example GOP parameter set 405 using "pseudo code" for descriptive purposes. The GOP parameter set 405 can be stored in memory that serves a compression engine, such as compression engine memory 298 (FIG. 2), among other memory locations.

Chroma information in a compressed video stream can be specified by one or more fields, each field of size equal to a finite number of bits. Without loss to the essence of the invention, a single or multiple fields in the compressed video stream may be employed to transport the chroma information.

As a decompression engine parses a compressed video stream, each field is interpreted according to the semantics and syntax of the specification of the format of the compressed video stream. Without limitation to the scope of the invention, a field in the compressed video stream may be a flag whose value is represented by the finite number of bits comprising the flag. A flag connotes information such as a property, attribute, or the absence or presence of a feature. Likewise, a field in the compressed video stream may represent data per the value represented by its finite number of bits. A field in the compressed video stream may represent a combination of one or more flags and one or more data tokens.

Without limitation to the scope of the invention, a flag in the compressed video stream is represented with a finite number of bits such as a one-bit flag (1-bit) for exemplary purposes. Likewise, a data field is represented with a finite number of bits such as a two-bits flag (2-bit) for exemplary purposes. Likewise, the fields may be represented in the following description as a type of field such as an unsigned number, expressed by the delimeter u( ), for exemplary purposes.

Without limitations to the scope of the invention, in the following description, a name is associated with field for exemplary purposes. For example, chroma_loc_int is used to refer to a field but the actual name does not limit the scope of the invention. The actual name of a field may be according to the specification of the syntax of the compressed video stream for a particular picture compression format.

A decompression engine may also opt to employ the same variable name as in the specification of the syntax of a compression format for the name of the memory location or register where the decompression engine stores the value of the respective field upon parsing the compressed video stream. A decompression engine may initialize the value of the variable to a default format during an initialization phase and/or prior to a first instance of the respective field in the compressed video stream.

The chroma_420_indicator is a one bit flag, u(1), in the GOP Parameter Set 405, although in other embodiments can include a greater or fewer number of bits. The code numbers in parenthesis can take on the following meanings:

Code_number=0: Default chroma location as specified in FIG. 3B for a progressive frame picture or FIG. 3C for an interlaced frame picture.

Code_number=1: Optional chroma location as specified by the value of chroma_loc_prog for a progressive scan picture or chroma_loc_int for an interlaced frame.

The chroma_loc_prog identifies an optional chroma location in a progressive scan picture. It is a 2-bit field, u(2), transmitted when chroma_420_indicator=1 and progressive_structure=1, although in other embodiments can include a greater or fewer number of bits. Thus, for progressive frame pictures, an encoder has the option to transmit one of the two alternate chroma locations shown in option 0 frame picture 402 and option 1 frame picture 404 in FIG. 4B by signaling the use of the optional chroma location with a chroma_420_indicator value equal to 1. FIG. 4B shows chroma locations for progressive pictures that are optional to those shown for the progressive frame picture illustrated in FIG. 3B. In FIG. 4B, the "X" denotes the location of a luma sample, the "0" in the grid (i.e., that is not the 0 in row and column indices 0, 0.5, 1, etc.) denotes the location of a chroma sample, and the "(1)" denotes that a chroma sample is co-sited (i.e., co-located) with a luma sample. The optional chroma location is specified by the value of chroma_loc_prog. A decompression engine (and/or upconverter) and presentation operation can ignore chroma_420_indicator and/or chroma_loc_prog, for example to implement its own predetermined chroma sampling scheme.

The chroma_loc_prog has the following meaning:

Code_number=0: Optional chroma location in the progressive picture as shown in the option 0 frame picture 402 of FIG. 4B.

Code_number=1: Optional chroma location in the progressive picture as shown in the option 1 frame picture 404 of FIG. 4B.

Code_number=2: RESERVED

Code_number=3: RESERVED

Note that the "RESERVED" sections are for providing extensibility (e.g., to add other options in the future).

For interlaced frame pictures, an encoder has the option to transmit one of four pairs of optional chroma locations (i.e., optional from those shown as the default locations in FIG. 3C) formed from designated locations for chroma samples in the top and bottom fields. FIGS. 4C-4D show chroma locations for interlaced fields that are optional to the default locations shown in FIG. 3C. The encoder (e.g., compression engine) signals the transmission of the optional chroma location with a chroma_420_indicator value equal to 1. The optional chroma location is specified by the value of a field in the stream with size equal to a finite number of bits. As one example, the field may be referred to as chroma_loc_int in the specification of the syntax of the compressed video stream and a decompression engine may opt to name the variable or memory location where it stores the value of the field. The chroma_loc_int identifies optional chroma locations in an interlaced frame. For example, it is a 2-bit field, u(2), transmitted when chroma_420_indicator=1 and progressive_structure=0, although in other embodiments it can include a greater or fewer number of bits.

The first three pairs of optional chroma samples (corresponding to code numbers 0-3 described below) are formed from the locations shown in the top field 406 and bottom field 407 of FIG. 4C. FIG. 4C illustrates the optional chroma locations for the top field 406 and bottom field 407 of an interlaced frame picture in the spatial domain. In FIG. 4C, "X" denotes the location of luma samples, the letters (other than "X") denote the optional locations of chroma samples according to a chroma_loc_int value, and the "( )" denotes that a chroma sample is co-sited with a luma sample. Valid pairs of chroma locations according to the value of chroma_loc_int are (B, L), (C, G) and (B, G). In other words, one way to view the interlaced frame pictures of FIG. 4C is to select the luma samples ("X") and one pair of chroma locations, ignoring the other pairs. For example, selecting the (B, L) pair option, one chroma/luma sample configuration can be the understood by viewing the top field 406 as including the luma samples located as shown by the "X's", and the chroma samples located as shown by the letter "B" (and ignoring the other letters). The bottom field 407 for the (B, L) pair option can be understood by viewing the bottom field 407 as including the luma samples ("X") as shown, and the chroma samples positioned as shown by the letter "L" (and ignoring the other letters). Note that for the bottom field 407, the chroma samples are co-sited with some of the luma samples (as represented by the "(L)").

As another example, the (C, G) pair option can be viewed in the top field 406 as including the luma samples as shown ("X"s), and the chroma samples represented by the letter "C". Note that the chroma samples are co-sited with some of the luma samples (as represented by the "(C)"). Similarly, for the bottom field 407, the luma samples are positioned as shown by the "X's" and the chroma samples are as shown by the letter "G" (and ignoring the other letters). A similar interpretation follows for the (B, G) pair.

The chroma_loc_int has the following meaning:

Code_number=0: (B, L) These chroma locations are representative of subsampling top field from 4:2:2 with even number of taps and bottom field with odd number of taps. Note that the number of taps refers to the number of coefficients used in a filter. Taps and filter placement effect a defined phase shift with respect to a luma sample position, depending in part on how the filter is applied to each respective line in a field or frame, and how it is applied to each field (e.g., in the case of interlaced frame pictures).

Code_number=1 (C, G) These chroma locations are representative of subsampling top field from 4:2:2 with odd number of taps and bottom field with even number of taps.

Code_number=2: (B, G) These chroma locations are representative of subsampling top field from 4:2:2 with even number of taps and bottom field with even number of taps.

Code_number=3 Chroma locations as shown in FIG. 4D, representative of PAL DV (digital video) format. In the PAL DV format, the chroma samples (CbCr) are not co-sited, unlike the other formats, but are subsampled separately (as shown in FIG. 4D as a separate Cb and a separate Cr). FIG. 4D illustrates the optional chroma locations for the top and bottom fields (408 and 409) of an interlaced picture in the spatial domain for PAL DV when the chroma_loc_int=3. However, as indicated by the "(Cr)" and "(Cb)", they are each co-sited with some of the luma samples ("X").

In one embodiment, a decompression engine (and/or upconverter) and presentation operation are allowed to ignore the chroma_420_indicator and/or the chroma_loc_int.

As it pertains to compression of 4:2:0 formatted data, the chroma downconversion filters employed by a first compression engine tends to differ more significantly from those implemented by a second compression engine than in comparison to when both, first and second compression engine perform downconversion of the chroma for compression of progressive frame pictures. A first compression engine producing a first compression video stream may differ from a second compression engine producing a second compression video stream for any of many possible reasons. For instance, the two compression engines may be from distinct manufacturers employing respective proprietary pre-processing schemes. Even when both compression engines are produced by the same manufacturer, the pre-processing performed in the production of the respective compressed video streams may differ according to the employment of different respective parameters to drive the pre-processing stage of the compression engine. For instance, parameters may vary in the pre-processing stage according to the target bit rate desired for the produced compressed video stream, and according to the compression mode (constant bit rate or variable bit rate).

The difference extent can be appreciated by considering that some video compression methodologies, such as MPEG-2 video, locate the chroma sample at the edge of consecutive luma rows, or equivalently at a 0.5 pixel offset in the vertical, as shown in FIG. 3C. However, the two consecutive rows of luma samples are from opposite fields in an interlaced frame picture. That is, the chroma samples do not lie vertically at the edge between the luma samples of the field. This suggests that a quarter pixel displacement (i.e., phase-shift) in the location of the chroma samples is necessary for placement between alternate luma rows comprising a field, or equivalently, a 0.5 pixel vertical displacement of the chroma sample in relation to the luma samples when considering all the rows (or lines of the two fields) that comprise the frame. The quarter pixel displacement in the top field is toward the top and the quarter pixel displacement in the bottom field is toward the bottom. This is possibly born from the assumption that interlaced pictures were originally progressive. Thus, a compression engine may opt to implement filters, that in addition to consideration for noise reduction, target bit-rate, and downscaling, may impose a first phase-shift in the chroma information in one type of field and a different or no phase-shift in the opposite field. Alternatively, no phase-shift may be imposed at all.

Regardless of what filtering strategy is employed during chroma downconversion by the compression engine, a compression engine can include auxiliary information in one or more of the layers of the compressed video sequence hierarchy (e.g., GOP and supplementary enhancement information layer) to specify the offsets of the chroma samples or the filters to the decompression engine so that the decompression engine (i.e., the upconverter of the decompression engine) can perform optimized filtering for upconversion of the chroma. In effect, the color signal component (i.e., the chroma) of the video signal will be downconverted at the downconverter 212 (FIG. 2) from the 4:2:2 color format to the 4:2:0 color format. Filters are preferably used by the downconverter 212 to make up for the loss of color information in the downconversion (i.e., by spreading the color component over the vertical direction of the pixel sample using weighted coefficients according to signal processing principles).

A problem can occur at the upconversion stage, wherein the upconverter 227 of the decompression engine 222 recreates the 4:2:2 color format from the 4:2:0 color format. Typically, a generalized filter is used to reconstruct the color information of the picture (and thus reconstruct the chroma values for each pixel), which results in some degradation (e.g., loss of color fidelity in fine objects and jaggedness in certain colors) of the picture quality. In a preferred embodiment, the interpolation and subsequent color information reconstruction process can be improved by the downconverter 212 (FIG. 2) (or a similar downconverter in a remote compression engine) communicating to the upconverter 227 (FIG. 2) of the decompression engine 222 (FIG. 2) the filter or chroma offset needed for upconverting from 4:2:0 to 4:2:2. This communication of information such as a filter or chroma offset information is herein understood to include transmission of the information regardless of whether it is intended that compression is being effected for storage purposes or for transmission over a transmission channel.

Figure 5:
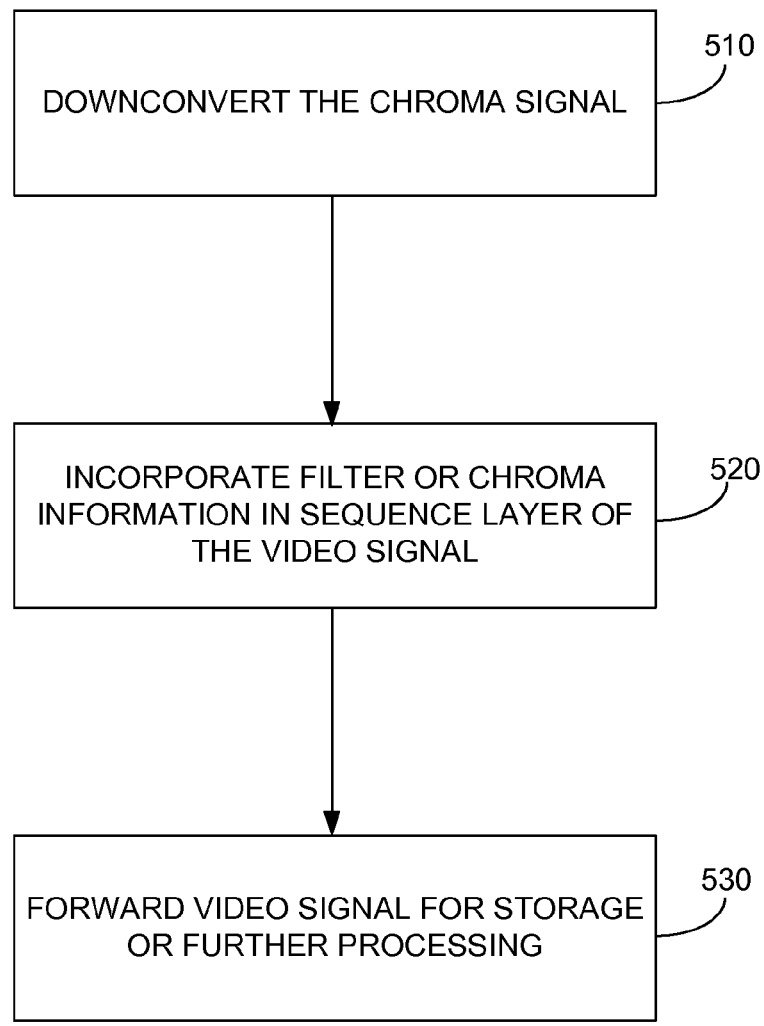
FIGS. 5-8 are flow diagrams that illustrate example methods of communication of filter or chroma information from a downconverter of a compression engine to an upconverter of a decompression engine, in accordance with several embodiments of the invention.

FIGS. 5-8 are flow diagrams that illustrate example methods for communicating the filter or the chroma information (e.g., chroma offset) from the downconverter 212 to the upconverter 227. In the embodiments of FIGS. 5-8, the filter or chroma offset can be stored either in the header or as an extension to the header, or as a separate field for the particular video stream layer. FIG. 5 includes the steps of downconverting the video signal from a 4:2:2 format to a 4:2:0 format (step 510), incorporating the filter information (or chroma offset) in the sequence layer of the video signal (step 520), and forwarding the video signal for storage or further processing (step 530). As is true for FIGS. 5-8, storage can include compression engine memory 298 (FIG. 2), decompression engine memory 299 (FIG. 2), memory 249 (FIG. 2) or the storage device 273 (FIG. 2) or other repositories in the DHCT 200, or similar components in other devices. Alternatively, for the benefit of a self-contained system as described above, the filter or offset information may be included with data annotations included in a separate file and stored in the storage device 273. In such an embodiment, the driver 211 (FIG. 2) interprets the separate file and sets the filters. The separate file is useful when the decompression engine 222 "knows" that the file exists and can make sense of the retained information.

Figure 6:
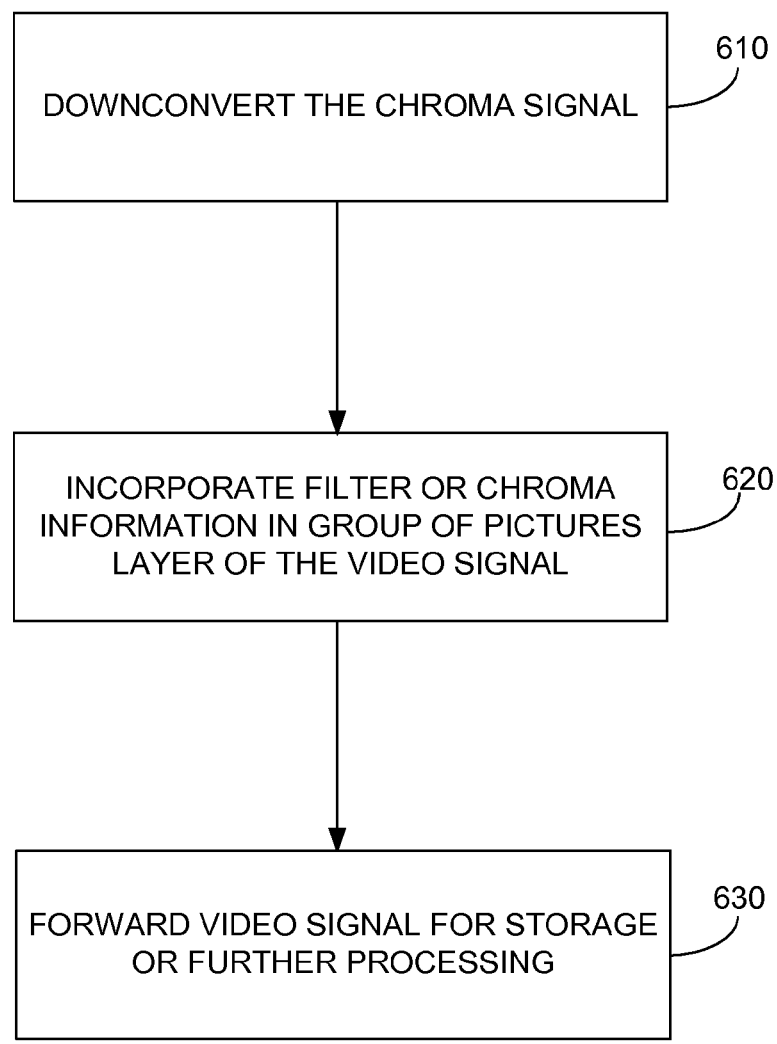
Figure 7:
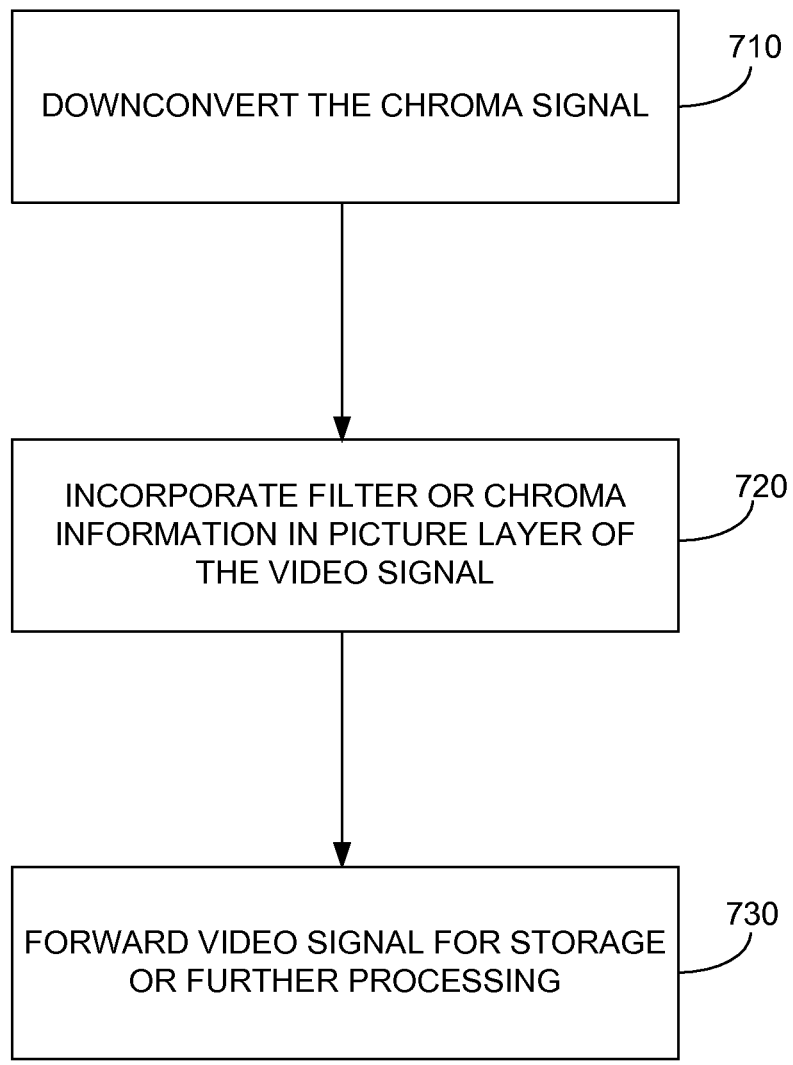
Figure 8:
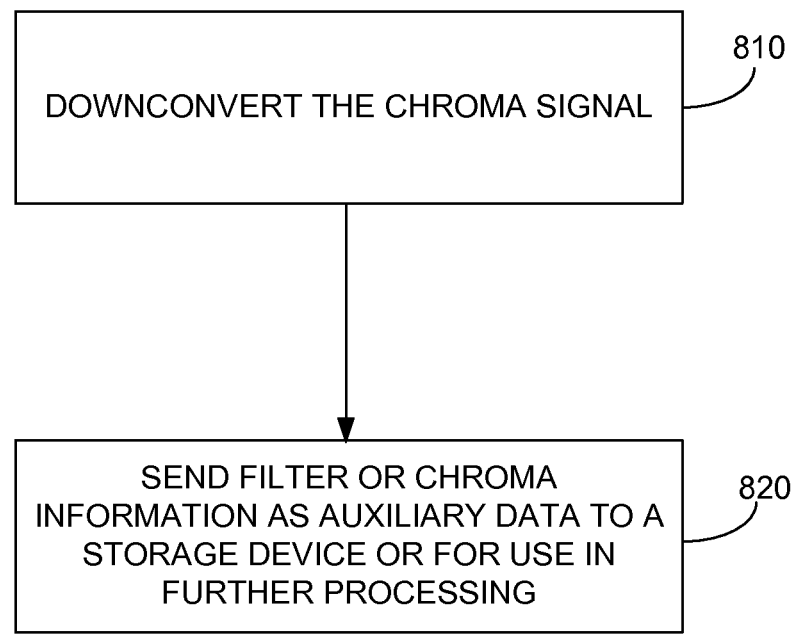

Further processing, as indicated in step 530, can include transmitting the compressed video stream with the respective chroma information or filter required for optimized conversion over a transmission channel when the compression is effected by a remote compression engine, as is also true for the use of the phrase "further processing" for FIGS. 6-8. FIG. 6 is another embodiment that includes the steps of downconverting the video signal 610, incorporating the filter or chroma offset in the GOP layer of the video signal 620, and forwarding the video signal for storage or further processing (step 630). FIG. 7 illustrates another embodiment, wherein the steps include downconverting the video signal 710, incorporating the filter or offset information in the picture layer of the video signal 720, and forwarding the video signal for storage or further processing (step 730).

Another embodiment is illustrated in FIG. 8, and includes the steps of downconverting the video signal 810 and sending the filter or offset information as auxiliary data for storage (e.g., in storage device 273, FIG. 2) (step 820), or sending to another location for further processing, such as transmitting it over a transmission channel when compression is effected by a remote compression engine. The filter information can be stored with the annotated data file such as the file that includes the program information table 203 (FIG. 2) or the index table 202 (FIG. 2) of the storage device 273. Alternatively, the filter information can be encoded as private data and associated with the video compressed stream. Alternatively, the filter information can be encoded as user data as part of the extensions permitted by the video syntax and semantics of the compressed video methodology. In the process of displaying the video signal, the upconverter 227 (FIG. 2), in communication with the device driver 211 (FIG. 2), can read this information from the program information table 203 and set the optimal upconversion filter. In other embodiments, the upconverter 227 can read the header or extension of the sequence layer, GOP layer, or picture layer to evaluate the filter information for optimum upconversion. Note also that in the self-contained system described above, the decompression engine 222 (or subcomponents thereof) can use the absence of the filter or chroma offset as a flag that upconversion is not required due to the fact, for example, that the video stream is being transmitted directly from a transmitted signal from the headend 110 (FIG. 1) without requiring upconversion (e.g., in the event an MPEG digital transport stream was sent from the headed 110). Further, in some embodiments, the filter information can also be transmitted as stuffing packets, as would be appreciated, in the context of the preferred embodiments described above, by those skilled in the art.

In an alternate embodiment, the chroma offsets relative to the luma samples are specified regardless of which downconversion filters were employed to generate the 4:2:0 downconversion and regardless of whether downconversion from 4:2:2 to 4:2:0 was performed at all. For instance, downconversion to 4:2:0 may not be performed at all when the digitized video signal presented at the input of the compression engine 217 (FIG. 2) is already in 4:2:0 format. A digitized video signal may already be in 4:2:0 color format for any of multiple reasons.

A video signal compressed a priori with a first video compression method results in a first compressed video stream representation of the video signal. The first compressed video stream comprises of compressed pictures in a first 4:2:0 color format that signifies a first chroma offset relative to the luma samples according to the specified chroma offset by a first set of syntax and semantics rules in the first video compression method. A second video compression method specifies that video signals be compressed according to a second set of syntax and semantics rules comprising a second 4:2:0 color format that signifies a second chroma offset relative to the luma samples.

In one embodiment, conversion from the video signal compressed with the first video compression method to a video signal compressed with the second video compression method is effected at headend 110 (FIG. 1) for transmission via network 130 (FIG. 1) and reception by DHCT 200 (FIG. 2). A decompression engine (not shown) in the headend 110 capable of decompressing the first compressed video stream decompresses the first compressed video stream and the decompressed and reconstructed pictures are then presented to the input of a second compression engine (not shown) in the headend 110 to produce the compressed video stream version corresponding to the second compression method. The second compression engine in the headend 110 retains the first 4:2:0 color format and includes information in the compressed video stream (following the second compression engine) that specifies the first 4:2:0 color format although the compressed video stream is a second compressed video stream. In essence, a conversion, or equivalently a transcoding operation, is performed from a first to a second compressed video stream representation and the first 4:2:0 color format is retained while the second 4:2:0 color format native to the second compression method is bypassed. After reception by the DHCT 200, the information specifying the chroma offset relative to the luma samples is provided to the upconverter 227 (FIG. 2) to perform the proper chroma upconversion. The upconverter 227 performs the chroma upconversion according to the first 4:2:0 color format rather than according to the second 4:2:0 color format and thus picture quality degradation in this implementation is avoided.

Therefore, video compressed streams corresponding to the second compressed video method are received in the DHCT 200 (FIG. 2) via the network 130 (FIG. 1) from the headend 110 (FIG. 1). Information in the compressed video stream specifies either the first or second 4:2:0 color format. The decompression engine 222 is capable of decompressing the compressed video stream compressed with the second compressed video method. The decompression engine 222 (FIG. 2) decompresses a video compressed stream and the respective 4:2:0 color format received in the compressed video stream is provided to the upconverter 227 to perform proper chroma upconversion. The upconverter 227 performs the chroma upconversion according to the specified 4:2:0 color format.

In an alternate embodiment, a decompression engine in the headend 110 (FIG. 1) does not effect full reconstruction of the compressed video signal but decompresses the compressed pictures in the first video compressed stream to a sufficient extent to convert them to a compressed video stream representative of the second video compression method. The compression engine in the headend 110 and the decompression engine in the headend 110 may be executing in the same physical computing device as different processes. Thus, the compression engine (e.g., a second compression engine at the headend 110) does not receive a fully reconstructed digitized video signal at its input but information corresponding to a partially but sufficiently decompressed video signal that represents an intermediate representation of the video signal that can be converted and compressed with the second video compression method.

In another alternate embodiment, video compressed streams in formats representative of the first and second compression video methods are received in the DHCT 200 (FIG. 2) via the network 130 (FIG. 1) from the headend 110 (FIG. 1). The decompression engine 222 (FIG. 2) is capable of decompressing video compressed streams, each compressed either with the first or second compressed video method. A compressed video stream according to a first video compression method is capable of including specifying information corresponding to a first or a second 4:2:0 color format. A compressed video stream according to a second video compression method is also capable of including specifying information corresponding to a first or a second 4:2:0 color format. The decompression engine 222 decompresses a video compressed stream according to its compressed format, and the respective 4:2:0 color format received in the compressed video stream is provided to the upconverter 227 (FIG. 2) to perform proper chroma upconversion. The upconverter 227 performs the chroma upconversion according to the specified 4:2:0 color format and/or the type of display device that it is driving.

The filter information or chroma information (e.g., chroma offset) can be embodied in many different forms. In one embodiment, a flag as small as one-bit can be part of the parameter set of the compressed video stream to notify a decompression engine that chroma or filter information (e.g., filter sets, offsets, etc.) is to be employed by the decompression engine for upconversion. No aggregate information is transmitted in the parameter set when the flag is inactive (or disabled). When the flag is enabled, aggregate information that informs the decompression engine of which filters to employ (or which offsets to accomplish) for upconversion is transmitted in the parameter set. The aggregate information may be as small as four bits (or a nibble) to specify one of sixteen (or fewer or more) possible sets of filters that already reside at the decompression engine's internal memory, circuit, and/or accessible external memory. Alternatively, a byte rather than a nibble can be employed to specify one of sixteen possible sets of filters for the top field and another for the bottom field. Yet another alternative is that the byte specifies a set of filters implied (e.g., implied by the chroma offset) for both type of fields.

The flag and the indexing field to be included in the parameter set that specifies information pertaining to which set of filters to use in the upconversion of chroma can be transmitted as part of the header of the picture sequence level, as a sequence extension, in the group of pictures layer, as part of the picture header or picture coding extension, as part of picture display extension, as part of the slice layer, as MPEG-2 private data and/or as user data.

An element specified to carry data or a parameter set in the hierarchical syntax of the video compression stream can serve as a vehicle to carry the chroma information or the minimum sufficient information required to signal to the decompression engine that it is required to implement an optimized chroma upconversion operation, such as a particular chroma offset. Signaling of chroma information with a minimum sized field serving as a flag thus consumes little overhead. In one embodiment, it is mandatory for a decompression engine to implement chroma upconversion when the flag is active. In an alternate embodiment, it is optional for a decompression engine to implement chroma upconversion when the flag is active.

Information related to chroma upconversion is transmitted at a defined periodicity. In one embodiment it is transmitted every half a second, and on another, every second. In yet another embodiment, the periodicity is determined by the established frequency of transmission for the parameter set that serves as the vehicle to carry the chroma information. In another embodiment, the activation flag is transmitted more frequently than the information that specifies the optimal filter for upconversion. The activation flag in such a case comprises a sufficient number of bits to signal at least one of three different states: active and no immediate transmission of information, active and immediate transmission of information, and not active (disabled).

Figure 9C:
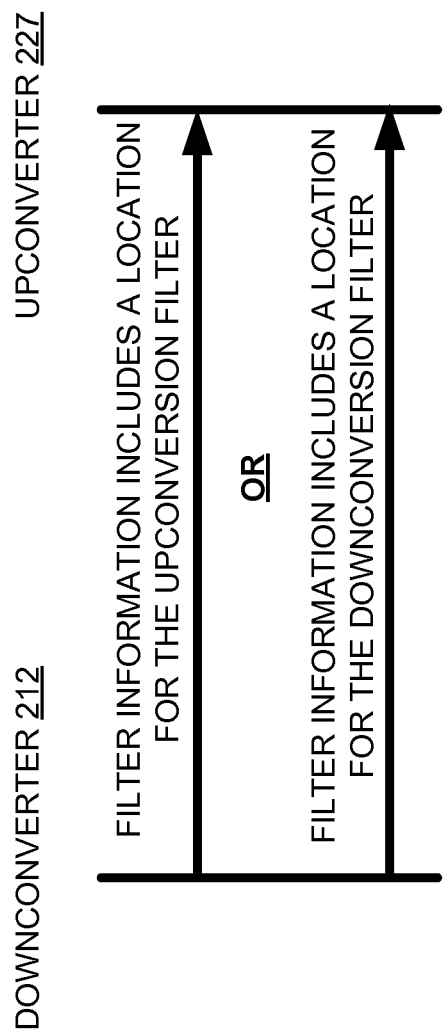

FIGS. 9A-9F are schematic diagrams that illustrate several embodiments of the filter information as it is transferred from the downconverter 212 to the upconverter 227. Although filter information will be described as being transferred in FIGS. 9A-9F, the transfer of chroma information (e.g., chroma offsets) can similarly apply. Note that for interlaced fields, the upconversion filter may or may not be different between the odd field and the even field. Also note that one or more of these implementations described below can be applied independently, or in combination to perform the upconversion of the 4:2:0 video signal. FIG. 9A shows some general interactions between the downconverter 212 and the upconverter 227. There may be an intermediary component that receives the information in some embodiments before passing it along to the upconverter 227, such as the compression engine memory 298 (FIG. 2), the decompression engine memory 299 (FIG. 2), the storage device 273 (FIG. 2), or memory 249 (FIG. 2), among other components or devices, or combinations thereof. It will be understood, in the context of the above description, that other components of the DHCT 200 (FIG. 2) can be employed in the described interactions, including the signal processing system 214 (FIG. 2), the device driver 211 (FIG. 2), the processor 244 (FIG. 2), memory 249 (and other memory not shown), among other components.

FIG. 9A depicts an implementation wherein the downconverter 212 forwards the upconverting filter to be used by the upconverter 227 for upconverting the 4:2:0 video signal. In this implementation, the downconverter 212 "knows" what filter it used for downconverting the video signal, and thus performs the closest inverse calculation to determine the optimal complement filter for use by the upconverter 227 in upconversion. In other embodiments, the downconverter 212 can use a look up table located locally in the compression engine memory 298 (FIG. 2), or in other memory, to determine the optimal filter for upconversion based on the filter the downconverter 212 used for downconversion. Alternatively, this inverse functionality can be processed by a processor under the direction of the compression engine 217 (FIG. 2) or subcomponents thereof in accordance to whether the DHCT 200 (FIG. 2) is driving an interlaced or a progressive TV. Upon receipt of the filter information by the upconverter 227 (e.g., via retrieval from the compression engine memory 298, the decompression engine memory 299 (FIG. 2), the storage device 273 (FIG. 2) or memory 249 (FIG. 2), etc., or direct from the downconverter 212) the upconverter 227 can implement this filter for upconversion.

FIG. 9B depicts another embodiment of the filter information. As shown, the filter information can be embodied as the downconversion filter used by the downconverter 212. The upconverter 227, upon receipt of this downconversion filter, would perform an inverse procedure to arrive at the optimal downconversion filter. The upconverter 227 could perform this internally, or in cooperation with other decompression engine subcomponents or other DHCT elements.

FIG. 9C is a schematic diagram of another implementation of the filter information. The downconverter 212, after downconverting, could store the filter used for downconverting, or the filter to be used for upconverting, in one of many various storage locations in the DHCT 200 (FIG. 2). For example, the downconverter 212 can cause the upconversion and/or downconversion filter to be stored in the storage device 273 under a particular file, or in system memory 249 in one or more registers, or in compression engine memory 298 (FIG. 2) or in the decompression engine memory 299 (FIG. 2). Then, the filter information would include an address or location (or filename) where the upconverter 227 can access the upconversion filter (or downconversion filter, and then perform an inverse operation as described in association with FIG. 9B) and apply to upconvert the video signal.

FIGS. 9D-9F illustrate several embodiments using a data table and an index to the data table. The data table can comprise a suite of filters (or chroma offsets) that can include the filters used for downconversion, the filters to be used for upconversion, or a combination of the two. In some implementations, the filters can be standardized in a video compression standard such as the draft H.26L. For example, FIG. 9D illustrates an implementation where the table includes the upconversion filters to be used by the upconverter 227. In this implementation, the table is sent by the downconverter 212, as well as an index to the proper upconversion filter to use. Transmission of filter information by a video compression methodology or standard would not limit employment of chroma upconversion optimization to a self-contained system with a storage device but would more widely permit transmission of digitally compressed video channels that carry the filter information (or chroma offset) in the compressed video stream as part of its semantics as syntax.

FIG. 9E illustrates an implementation where the table includes the upconversion filters and the downconversion filters, and it is sent by the downconverter 212 as well as an index as to what downconverson filter was used. In this implementation, the upconverter 227 treats this table as a look up table and selects the appropriate upconversion filter, or alternatively the appropriate chroma offsets based on the index to the downconversion filter used. Alternatively, the data table can include just the downconversion filter used along with an index to the filter used, and the upconverter 227 will perform the proper inverse function (or other devices will perform alone or in cooperation with the decompression engine subcomponents) to determine the optimal upconversion filter to use.

FIG. 9F illustrates an implementation where the table is available for ready disposition at the upconverter 227, for example in the decompression engine memory 299 (FIG. 2) or at a known (known by the compression engine 217 (FIG. 2) and the decompression engine 222) addressable location for the decompression engine 222. In this implementation, the downconverter 212 sends the index number to the table, where the index number can indicate the upconversion filter (or chroma offset) to use, or in other embodiments, the downconversion filter used (and thus the upconverter 227 would perform the proper inverse function to determine the optimal upconversion filter).

FIG. 10 is another schematic diagram that illustrates another embodiment, described previously, for informing the upconverter 227 as to how to sample the chroma information. As shown, the downconverter 212 can send a chroma offset, as explained in association with FIGS. 4A-4D. The upconverter 227, upon receipt of this information, can implement the appropriate filter to effect this offset.

Note that the preferred embodiments are not limited to DHCT devices located in a network. The preferred embodiments can be employed in consumer devices, such as digital video disc (DVD) players, or other electronic devices or systems that have co-located upconversion/downconversion functionality. Further, one or more components of the preferred embodiments can be co-located in a single device, such as a single semiconductor chip or in a single DHCT, or in other embodiments, can be distributed among several components within the DHCT or among one or more other embedded devices in addition to and/or in lieu of the DHCT. For example, a compressed video stream and/or a decompressed video stream can be resident or deposited in memory 249 (FIG. 2) or other memory in the DHCT 16 due to compression and/or decompression functionality implemented externally to the DHCT 16 and loaded into memory via other mechanisms, such as via the communication ports 274 or via a memory card (not shown), to mention a few examples of many. As another example, in some embodiments, the chroma information and the filter information can be transmitted between compression and decompression engines that are co-located within a single embedded device or distributed among several embedded devices.

The compression engine 217, pre-processor 213, downconverter 212, decompression engine 222, video decompressor 223, and the upconverter 227 (FIG. 2) can be implemented in hardware, software, firmware, or a combination thereof. In the preferred embodiment(s), the compression engine 217, pre-processor 213, downconverter 212, decompression engine 222, video decompressor 223, and the upconverter 227 are implemented in a digital signal processor or media processor device capable of executing media instructions such as multiply-and-accumulate. Multiplication would result in multiple multiplication of chroma values in parallel and their collective products added. In an alternate embodiment, the downconverter and upconverter are preferably implemented in dedicated circuitry that retain filter tap values in registers and implements multiplication for corresponding pixel values at the same location of multiple lines in a systematic pipelined fashion. Alternatively, software and firmware that is stored in a memory and that is executed by a suitable instruction execution system is employed to effect the downconversion and upconversion operations. If implemented in hardware, as in an alternative embodiment, the compression engine 217, pre-processor 213, downconverter 212, decompression engine 222, video decompressor 223, and the upconverter 227 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Filters implemented in hardware or software may comprise poly-phase filters, each of multiple taps to attain a certain filtering precision and accuracy, and such filters may fulfill multiple objectives simultaneously, including noise reduction and picture dimension downscaling. The filter values may vary according to a compression engine's encoding strategy for different target bit rates. Poly-phase filter implementation can cause filter tap values to be updated from line to line according to the number of phases employed.

A downconversion or upconversion filter implementation can be implemented by performing filtering first and sampling of information immediately after processing of a prespecified amount of video data (e.g., on every line).

The compression engine 217, pre-processor 213, downconverter 212, decompression engine 222, video decompressor 223, and the upconverter 227 (FIG. 2), which can comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least the following is claimed:

1. A method for converting chroma information for a picture in a compressed video stream, the method comprising the steps of:
   providing in a compressed video stream that includes a picture having chroma samples and luma samples by a decompression engine; and
   providing in the compressed video stream a flag for signaling information corresponding to a location of the chroma samples in relation to the luma samples in the picture by the decompression engine to an up-converter for converting the chroma samples in the picture, wherein a first defined flag value indicates default locations of the chroma samples in relation to the luma samples in the picture, wherein a second defined flag value indicates a presence in the compressed video stream of auxiliary chroma information corresponding to relative locations of the chroma samples to the luma samples in the picture, wherein the relative locations are determined by loading an optional chroma location variable, and wherein the auxiliary chroma information includes a field comprising one of the following: a first field indicating the location of the chroma samples for a progressive scan picture and a second field indicating the location of the chroma samples for an interlaced picture.

2. The method of claim 1, wherein the number of chroma samples in the picture implied by the first defined flag value is equal to the number of chroma samples in the picture implied by the second defined flag value.

3. The method of claim 2, wherein a first value of the auxiliary chroma information is defined to correspond to relative locations of the chroma samples that are different than the default locations of the chroma samples in relation to the luma samples in the picture.

4. The method of claim 2, wherein the step of providing the flag in the compressed video stream comprises the step of providing a one-bit flag.

5. The method of claim 4, wherein the step of providing the one-bit flag in the compressed video stream comprises the step of providing the one-bit flag having the first defined flag value.

6. The method of claim 5, further including the step of transmitting the compressed video stream with the one-bit flag having the first defined flag value.

7. The method of claim 5, further including the steps of:
   providing a second compressed video stream different than the compressed video stream, said second compressed video stream including a second picture having chroma samples and luma samples;
   providing in the second compressed video stream a second flag for signaling information corresponding to the location of the chroma samples in relation to the luma samples in the second picture, said provided second flag having the second defined flag value; and
   providing in the second compressed video stream a second auxiliary chroma information, said provided second auxiliary chroma information having a value that corresponds to relative locations of the chroma samples that are different than the default locations of the chroma samples in relation to the luma samples in the second picture.

8. The method of claim 4, further including the step of providing the auxiliary chroma information in the compressed video stream, and wherein the step of providing the one-bit flag in the compressed video stream comprises the step of providing the one-bit flag having the second defined flag value.

9. The method of claim 8, further including the step of transmitting the compressed video stream with the one-bit flag having the second defined flag value and the auxiliary chroma information in the compressed video stream.

10. The method of claim 9, wherein a first value of the auxiliary chroma information in the compressed video stream corresponds to relative locations of the chroma samples that are different than the default locations of the chroma samples in relation to the luma samples in the picture.

11. The method of claim 1, wherein a first value of the auxiliary chroma information is defined to correspond to relative locations of the chroma samples that are different than the default locations of the chroma samples in relation to the luma samples in the picture.

12. The method of claim 2, further including the step of providing in the compressed video stream a plurality of instances of a parameter set associated with the picture, each instance of said parameter set in the compressed video stream including the flag for signaling information corresponding to the location of the chroma samples in relation to the luma samples in the picture.

13. The method of claim 1, wherein the auxiliary chroma information further corresponds to first and second locations of the chroma samples in relation to the luma samples in the picture, said first relative locations of the chroma samples corresponding to a top field of the picture, and said second relative locations of the chroma samples corresponding to a bottom field of the picture.

14. The method of claim 13, further including the step of providing in the compressed video stream a plurality of instances of a parameter set associated with the picture, each instance of said parameter set in the provided compressed video stream including the flag for signaling information corresponding to the location of the chroma samples in relation to the luma samples in the picture.

15. A method for converting chroma information in a compressed video stream, the method comprising the steps of:
receiving a compressed video stream that includes a picture having chroma samples and luma samples by a decompression engine; and
receiving in the compressed video stream a flag for signaling information corresponding to the location of the chroma samples in relation to the luma samples in the picture by the decompression engine for transmitting the flag to an up-converter for converting the chroma samples in the picture, wherein a first defined flag value indicates default locations of the chroma samples in relation to the luma samples in the picture, wherein a second defined flag value indicates a presence in the compressed video stream of auxiliary chroma information corresponding to relative locations of the chroma samples to the luma samples in the picture, wherein the relative locations are determined by loading an optional chroma location variable, and wherein the auxiliary chroma information includes a field comprising one of the following: a first field indicating the location of the chroma samples for a progressive scan picture and a second field indicating the location of the chroma samples for an interlaced picture.

16. The method of claim 15, wherein the number of chroma samples in the picture implied by the first defined flag value is equal to the number of chroma samples in the picture implied by the second defined flag value.

17. The method of claim 16, wherein the step of receiving the flag in the compressed video stream comprises the step of receiving a one-bit flag.

18. The method of claim 17, wherein the step of receiving the one-bit flag in the compressed video stream comprises the step of receiving the one-bit flag having the first defined flag value.

19. The method of claim 18, further including the steps of:
receiving a second compressed video stream different than the compressed video stream, said second compressed video stream including a second picture having chroma samples and luma samples; receiving in the second compressed video stream a second flag for signaling information corresponding to the location of the chroma samples in relation to the luma samples in the second picture, said received second flag having the second defined flag value; and
receiving in the second compressed video stream a second auxiliary chroma information, said received second auxiliary chroma information having a value that corresponds to relative locations of the chroma samples that are different than the default locations of the chroma samples in relation to the luma samples in the second picture.

20. A system for converting chroma information for a picture in a compressed video stream, the system comprising:
a memory with logic; and
a processor comprises a decompression engine and an up-converter configured with the logic to:
provide in a compressed video stream that includes a picture having chroma samples and luma samples by a decompression engine; and
provide in the compressed video stream a flag for signaling information corresponding to the location of the chroma samples in relation to the luma samples in the picture by the decompression engine to the up-converter for converting the chroma samples in the picture, wherein a first defined flag value indicates default locations of the chroma samples in relation to the luma samples in the picture, wherein a second defined flag value indicates a presence in the compressed video stream of auxiliary chroma information corresponding to relative locations of the chroma samples to the luma samples in the picture, wherein the relative locations are determined by loading an optional chroma location variable and wherein the number of chroma samples in the picture implied by the first defined flag value is equal to the number of chroma samples in the picture implied by the second defined flag value, and wherein the auxiliary chroma information includes a field comprising one of the following: a first field indicating the location of the chroma samples for a progressive scan picture and a second field indicating the location of the chroma samples for an interlaced picture.

* * * * *